United States Patent
Handelman

(10) Patent No.: US 9,054,955 B2
(45) Date of Patent: Jun. 9, 2015

(54) APPARATUS AND METHODS FOR ENABLING RECOVERY FROM FAILURES IN OPTICAL NETWORKS

(71) Applicant: Doron Handelman, Givatayim (IL)

(72) Inventor: Doron Handelman, Givatayim (IL)

( * ) Notice: Subject to any disclaimer, the term of this patent is extended or adjusted under 35 U.S.C. 154(b) by 411 days.

(21) Appl. No.: 13/731,039

(22) Filed: Dec. 30, 2012

(65) Prior Publication Data
US 2014/0186020 A1    Jul. 3, 2014

(51) Int. Cl.
| | |
|---|---|
| G02F 1/00 | (2006.01) |
| H04L 12/24 | (2006.01) |
| H04J 14/02 | (2006.01) |

(52) U.S. Cl.
CPC ......... *H04L 41/0668* (2013.01); *H04J 14/0268* (2013.01); *H04J 14/0269* (2013.01); *H04J 14/0294* (2013.01); *H04J 14/0295* (2013.01)

(58) Field of Classification Search
CPC .... H04B 10/03; H04B 10/032; H04B 10/035; H04B 10/038
USPC ............ 398/1, 2, 3, 4, 5, 7, 8, 45, 48, 49, 57, 398/58, 59, 33, 38, 10, 13, 17, 20, 25; 370/216, 217, 221, 225, 227, 228, 223, 370/468
See application file for complete search history.

(56) References Cited

U.S. PATENT DOCUMENTS

| | | |
|---|---|---|
| 6,404,522 B1 | 6/2002 | Handelman |
| 6,574,018 B1 | 6/2003 | Handelman |
| 6,763,191 B1 | 7/2004 | Handelman |
| 7,099,587 B2 | 8/2006 | Handelman |
| 7,106,967 B2 | 9/2006 | Handelman |
| 7,162,155 B2 | 1/2007 | Handelman |
| 7,167,620 B2 | 1/2007 | Handelman |
| 7,181,139 B2 | 2/2007 | Handelman et al. |
| 7,188,280 B2 | 3/2007 | Shinomiya et al. |
| 7,460,783 B2 * | 12/2008 | Fumagalli et al. ................ 398/5 |
| 7,570,844 B2 | 8/2009 | Handelman |
| 7,965,712 B2 | 6/2011 | Handelman |
| 2002/0181503 A1 | 12/2002 | Montgomery, Jr. |
| 2003/0156841 A1 | 8/2003 | Chraplyvy et al. |
| 2003/0223465 A1 | 12/2003 | Blanchard |
| 2005/0089126 A1 | 4/2005 | Zerbe et al. |
| 2008/0050118 A1 | 2/2008 | Haran et al. |
| 2010/0232784 A1 * | 9/2010 | Rarick et al. ...................... 398/5 |

OTHER PUBLICATIONS

Spectral grids for WDM applications: DWDM frequency grid, Edition 2.0 of Recommendation ITU-T G.694.1 (Feb. 2012), 16 pages, International Telecommunication Union (ITU).

(Continued)

*Primary Examiner* — Hahn Phan

(57) ABSTRACT

Apparatus for enabling recovery from failures in up to M working paths of a set of N working paths that are allocated N frequency slots of L different slot widths, where M, N and L are positive integers, $N \geq L > 1$, and $N > M > 1$. The apparatus includes a processor and a control plane interface. The processor is operative to allocate protection frequency slots to M protection paths in different manners depending on whether M is greater than L, equal to L or less than L. The control plane interface is operatively associated with the processor and is operative to effect provisioning of the M protection paths for supporting recovery from the failures. Related network, apparatus and methods are also disclosed.

20 Claims, 8 Drawing Sheets

(56) References Cited

OTHER PUBLICATIONS

Shen et al, Spectrum-Efficient and Agile CO-OFDM Optical Transport Networks: Architecture, Design, and Operation, IEEE Communications Magazine, May 2012, pp. 82-89, vol. 50, No. 5, The Institute of Electrical and Electronics Engineers, Inc., USA.
Jinno et al, Spectrum-Efficient and Scalable Elastic Optical Path Network: Architecture, Benefits, and Enabling Technologies, IEEE Communications Magazine, Nov. 2009, pp. 66-73, vol. 47, No. 11, The Institute of Electrical and Electronics Engineers, Inc., USA.
Gringeri et al, Flexible Architectures for Optical Transport Nodes and Networks, IEEE Communications Magazine, Jul. 2010, pp. 40-50, vol. 48, No. 7, The Institute of Electrical and Electronics Engineers, Inc., USA.
Roberts et al, 100G and Beyond with Digital Coherent Signal Processing, IEEE Communications Magazine, Jul. 2010, pp. 62-69, vol. 48, No. 7, The Institute of Electrical and Electronics Engineers, Inc., USA.
Gerstel et al, Elastic Optical Networking: A New Dawn for the Optical Layer?, IEEE Communications Magazine, Feb. 2012, pp. S12-S20, vol. 50, No. 2, The Institute of Electrical and Electronics Engineers, Inc., USA.
Griffith, IETF Work on Protection and Restoration for Optical Networks, Optical Networks Magazine, Jul./Aug. 2003, pp. 101-106.
Lang et al., Generalized Multi-Protocol Label Switching (GMPLS) Recovery Functional Specification, Internet Draft draft-ietf-ccamp-gmpls-recovery-functional-03.txt, Oct. 2004, 18 pages, IETF.
U.S. Appl. No. 13/558,166 of Handelman, filed Jul. 25, 2012.
Berger, Generalized Multi-Protocol Label Switching (GMPLS) Signaling Functional Description, RFC3471, Jan. 2003, 34 pages, Internet Society.
Hardy, Alcatel-Lucent makes 400-Gbps play, Lightwave, www.lightwaveonline.com, Mar. 6, 2012, 2 pages, PennWell Corporation.
ZTE displays 400-Gbps and 1-Tbps DWDM prototype, Lightwave, www.lightwaveonline.com, Jun. 18, 2012, 2 pages, PennWell Corporation.
Hardy, Infinera offers Instant Bandwidth on DTN-X packet optical transport platform, Lightwave, www.lightwaveonline.com, Nov. 12, 2012, 3 pages, PennWell Corporation.
Allen et al., Digital Optical Networks Using Photonic Integrated Circuits (PICs) Address the Challenges of Reconfigurable Optical Networks, IEEE Communications Magazine, Jan. 2008, pp. 35-43, vol. 46, No. 1, The Institute of Electrical and Electronics Engineers, Inc., USA.
Melle et al., Bandwidth Virtualization Enables Long-Haul WDM Transport of 40 Gb/s and 100 Gb/s Services, IEEE Communications Magazine, Feb. 2008, pp. S22-S29, vol. 46, No. 2, The Institute of Electrical and Electronics Engineers, Inc., USA.
Gringeri et al, Technical Considerations for Supporting Data Rates Beyond 100 Gb/s, IEEE Communications Magazine, Feb. 2012, pp. S21-S30, vol. 50, No. 2, The Institute of Electrical and Electronics Engineers, Inc., USA.
Hardy, Infinera lays out 40G/100G coherent roadmap, Lightwave, www.lightwaveonline.com, May 20, 2010, 1 page, PennWell Corporation.
Jinno et al, Multiflow Optical Transponder for Efficient Multilayer Optical Networking, IEEE Communications Magazine, May 2012, pp. 56-65, vol. 50, No. 5, The Institute of Electrical and Electronics Engineers, Inc., USA.
Ye et al, A Simple Dynamic Integrated Provisioning/Protection Scheme in IP over WDM Networks, IEEE Communications Magazine, Nov. 2001, pp. 174-182, vol. 39, No. 11, The Institute of Electrical and Electronics Engineers, Inc., USA.
Roorda et al, Restoration schemes for agile photonic networks, Lightwave Europe, www.lightwave-europe.com, Aug. 2003, pp. 10 and 12.
Rajagopalan et al, IP over Optical Networks: Architectural Aspects, IEEE Communications Magazine, Sep. 2000, pp. 94-102, vol. 38, No. 9, The Institute of Electrical and Electronics Engineers, Inc., USA.
Appelman et al, All-Optical Switching Technologies for Protection Applications, IEEE Optical Communications, Nov. 2004, pp. S35-S40, vol. 42, No. 11, The Institute of Electrical and Electronics Engineers, Inc., USA.
Maesschalck et al, Intelligent Optical Networking for Multilayer Survivability, IEEE Communications Magazine, Jan. 2002, pp. 42-49, vol. 40, No. 1, The Institute of Electrical and Electronics Engineers, Inc., USA.
Sambo et al, Toward High-Rate and Flexible Optical Networks, IEEE Communications Magazine, May 2012, pp. 66-72, vol. 50, No. 5, The Institute of Electrical and Electronics Engineers, Inc., USA.
Ellinas et al, Routing and restoration architectures in mesh optical networks, Optical Networks Magazine, Jan./Feb. 2003, pp. 91-106.
Androulidakis et al, Service Differentiation and Traffic Engineering in IP over WDM Networks, IEEE Communications Magazine, May 2008, pp. 52-59, vol. 46, No. 5, The Institute of Electrical and Electronics Engineers, Inc., USA.
Manzalini et al, Architecture and Functional Requirements of Control Planes for Automatic Switched Optical Networks: Experience of the IST Project LION, IEEE Communications Magazine, Nov. 2002, pp. 60-65, vol. 40, No. 11, The Institute of Electrical and Electronics Engineers, Inc., USA.
Xie et al, A Dynamic Bandwidth Allocation Scheme for Differentiated Services in EPONs, IEEE Optical Communications, Aug. 2004, pp. S32-S39, vol. 42, No. 8, The Institute of Electrical and Electronics Engineers, Inc., USA.
Chiu et al, Control plane considerations for all-optical and multi-domain optical networks and their status in OIF and IETF, Optical Networks Magazine, Jan./Feb. 2003, pp. 26-35.
Taniguchi et al, Operational Evaluation of ASON/GMPLS Interdomain Capability over a JGN II Network Testbed, IEEE Communications Magazine, May 2008, pp. 60-66, vol. 46, No. 5, The Institute of Electrical and Electronics Engineers, Inc., USA.
Zik, Enabling Highly Survivable Automated On-Demand Dynamic Network Services with Intelligent Optical Control Planes, IEEE Communications Magazine, Jul. 2008, pp. 154-157, vol. 46, No. 7, The Institute of Electrical and Electronics Engineers, Inc., USA.
Xia et al, High-Capacity Optical Transport Networks, IEEE Communications Magazine, Nov. 2012, pp. 170-178, vol. 50, No. 11, The Institute of Electrical and Electronics Engineers, Inc., USA.
Vass, Optical communications trends for 2011, Lightwave, www.lightwaveonline.com, Jan. 12, 2011, 3 pages, PennWell Corporation.
Jones et al, A Justification for a Variable Bandwidth Allocation methodology for SONET Virtually Concatenated SPEs, Jul. 10-14, 2000, 4 pages, T1X1.5/2000-157R1, a contribution to T1 standards project—T1X1.5.
Jones et al, A Proposed Link Capacity Adjustment Scheme (LCAS) for SONET Virtually Concatenated SPEs, Oct. 9-13, 2000, 30 pages, T1X1.5/2000-199, a contribution to T1 standards project—T1X1.5.
Link capacity adjustment scheme (LCAS) for virtual concatenated signals, ITU-T Recommendation G.7042/Y.1305, Feb. 2004, 32 pages, International Telecommunication Union (ITU).
Link capacity adjustment scheme (LCAS) for virtual concatenated signals, ITU-T Recommendation G.7042/Y.1305 (2004)—Corrigendum 1, Aug. 2004, 22 pages, International Telecommunication Union (ITU).
Jinno et al, Distance-Adaptive Spectrum Resource Allocation in Spectrum-Sliced Elastic Optical Path Network, IEEE Communications Magazine, Aug. 2010, pp. 138-145, vol. 48, No. 8, The Institute of Electrical and Electronics Engineers, Inc., USA.
Wei et al, Cognitive Optical Networks: Key Drivers, Enabling Techniques, and Adaptive Bandwidth Services, IEEE Communications Magazine, Jan. 2012, pp. 106-113, vol. 50, No. 1, The Institute of Electrical and Electronics Engineers, Inc., USA.
Reddy et al, Ethernet Aggregation and Transport Infrastructure OAM and Protection Issues, IEEE Communications Magazine, Feb. 2009, pp. 152-159, vol. 47, No. 2, The Institute of Electrical and Electronics Engineers, Inc., USA.
Bottorff et al, Scaling Provider Ethernet, IEEE Communications Magazine, Sep. 2008, pp. 104-109, vol. 46, No. 9, The Institute of Electrical and Electronics Engineers, Inc., USA.
Takács et al, GMPLS Controlled Ethernet: An Emerging Packet-Oriented Transport Technology, IEEE Communications Magazine,

(56) References Cited

OTHER PUBLICATIONS

Sep. 2008, pp. 118-124, vol. 46, No. 9, The Institute of Electrical and Electronics Engineers, Inc., USA.

Ryoo et al, Ethernet Ring Protection for Carrier Ethernet Networks, IEEE Communications Magazine, Sep. 2008, pp. 136-143, vol. 46, No. 9, The Institute of Electrical and Electronics Engineers, Inc., USA.

Helvoort et al, Standards bring more flexibility to optical transport, Optical Networks Magazine, Jan./Feb. 2003, pp. 53-58.

Fendick et al, Global optical Ethernet, Optical Networks Magazine, Jan./Feb. 2003, pp. 70-79.

Jajszczyk, Automatically Switched Optical Networks: Benefits and Requirements, IEEE Optical Communications, Feb. 2005, pp. S10-S15, vol. 43, No. 2, The Institute of Electrical and Electronics Engineers, Inc., USA.

Luo et al, Bandwidth Allocation for Multiservice Access on EPONs, IEEE Optical Communications, Feb. 2005, pp. S16-S21, vol. 43, No. 2, The Institute of Electrical and Electronics Engineers, Inc., USA.

* cited by examiner

APPARATUS AND METHODS FOR ENABLING RECOVERY FROM FAILURES IN OPTICAL NETWORKS

FIELD OF THE INVENTION

The present invention generally relates to optical networks, and more particularly to optical networks that utilize or are configured to utilize a flexibly allocated optical spectrum.

BACKGROUND OF THE INVENTION

A flexible dense wavelength division multiplexing (DWDM) grid has been introduced in Edition 2.0 of the International Telecommunication Union (ITU) Recommendation ITU-T G.694.1 (February 2012).

The following references are further believed to represent the state of the art:

an article entitled "Spectrum-Efficient and Agile CO-OFDM Optical Transport Networks: Architecture, Design, and Operation", by Gangxiang Shen and Moshe Zukerman, in *IEEE Communications Magazine*, May 2012, pages 82-89;

an article entitled "Spectrum-Efficient and Scalable Elastic Optical Path Network: Architecture, Benefits, and Enabling Technologies", by Masahiko Jinno, Hidehiko Takara, Bartlomiej Kozicki, Yukio Tsukishima, Yoshiaki Sone, and Shinji Matsuoka, in *IEEE Communications Magazine*, November 2009, pages 66-73;

an article entitled "Flexible Architectures for Optical Transport Nodes and Networks", by Steven Gringeri, Bert Basch, Vishnu Shukla, Roman Egorov, and Tiejun J. Xia, in *IEEE Communications Magazine*, July 2010, pages 40-50;

an article entitled "100G and Beyond with Digital Coherent Signal Processing", by Kim Roberts, Douglas Beckett, David Boertjes, Joseph Berthold, and Charles Laperle, in *IEEE Communications Magazine*, July 2010, pages 62-69;

an article entitled "Elastic Optical Networking: A New Dawn for the Optical Layer?", by Ori Gerstel, Masahiko Jinno, Andrew Lord, and S. J. Ben Yoo, in *IEEE Communications Magazine*, February 2012, pages S12-S20;

an article entitled "IETF Work on Protection and Restoration for Optical Networks", by David W. Griffith in *Optical Networks Magazine,* July/August 2003, pages 101-106; and an Internet Draft draft-ietf-ccamp-gmpls-recovery-functional-03.txt entitled "Generalized Multi-Protocol Label Switching (GMPLS) Recovery Functional Specification", of the Network Working Group, edited by Jonathan P. Lang and Bala Rajagopalan and dated October 2004.

SUMMARY OF THE INVENTION

Certain embodiments of the present invention provide apparatus and methods for enabling recovery from failures in optical networks that utilize or are configured to utilize a flexibly allocated optical spectrum.

The term "recovery" is used throughout the present specification and claims to denote both types of recovery, namely protection and restoration.

The term "failure" is used throughout the present specification and claims to include a failure which disables communication over a working path or link, or degrades communication over the working path or link to an unacceptable level.

The term "elastic optical network" (EON) is used throughout the present specification and claims to include an optical network that makes use of a flexibly allocated optical spectrum and of optical transceivers that are operable in such flexibly allocated optical spectrum and can generate optical paths with elastically adaptable bandwidth.

The term "optical transceiver" is used throughout the present specification and claims to include a combination of an optical transmitter and an optical receiver.

There is thus provided in accordance with an embodiment of the present invention apparatus for enabling recovery from failures in up to M working paths of a set of N working paths that are allocated N frequency slots of L different slot widths, where M, N and L are positive integers, $N \geq L > 1$, and $N > M \geq 1$, the apparatus including a processor operative to allocate protection frequency slots to M protection paths as follows: if $M<L$, to allocate M protection frequency slots of slot widths corresponding to the M greatest different slot widths of the L different slot widths to the M protection paths, if $M=L$, to allocate M protection frequency slots of slot widths corresponding to the L different slot widths to the M protection paths, and if $M>L$, to allocate L protection frequency slots of slot widths corresponding to the L different slot widths to L of the M protection paths and to allocate M-L additional protection frequency slots of slot widths corresponding to at least one of the L different slot widths to the remaining M–L protection paths, and a control plane interface operatively associated with the processor and operative to effect provisioning of the M protection paths for supporting recovery from the failures.

In some embodiments, the apparatus further includes an input unit operatively associated with the processor and operative to receive one of an externally generated instruction and an externally generated message, wherein the processor is operative to allocate the protection frequency slots to the M protection paths in response to the one of the externally generated instruction and the externally generated message.

In some embodiments, the N frequency slots of L different slot widths include one of the following: frequency slots of a flexible dense wavelength division multiplexing (DWDM) grid according to Edition 2.0 of the International Telecommunication Union (ITU) Recommendation ITU-T G.694.1 (February 2012), frequency slots that are flexibly allocated, but not according to the flexible DWDM grid according to Edition 2.0 of the ITU Recommendation ITU-T G.694.1 (February 2012), and a combination of some frequency slots of the flexible DWDM grid according to Edition 2.0 of the ITU Recommendation ITU-T G.694.1 (February 2012) and some frequency slots that are flexibly allocated, but not according to the flexible DWDM grid according to Edition 2.0 of the ITU Recommendation ITU-T G.694.1 (February 2012).

In some embodiments, at least one of the M protection paths includes a backup label switched path (LSP).

In some embodiments, the N working paths are allocated the N frequency slots of L different slot widths for use with at least L different bit rates which include at least two of the following bit rates: substantially 100 Gigabit per second (Gb/s), substantially 400 Gb/s, and substantially 1 Terabit per second (Tb/s).

In some embodiments, the L different slot widths include at least two of the following slot widths: 50 Gigahertz (GHz), 75 GHz, and 150 GHz.

In some embodiments, at least one of the M protection paths includes a restoration path.

In some embodiments, the apparatus is included in a network control and management system (NCMS). In other embodiments, the apparatus is included in a network element (NE) at a node of an elastic optical network (EON).

There is also provided in accordance with a further embodiment of the present invention a method of enabling recovery from failures in up to M working paths of a set of N working paths that are allocated N frequency slots of L different slot widths, where M, N and L are positive integers, N≥L>1, and N>M>1, the method including allocating protection frequency slots to M protection paths, the allocating including if M<L, allocating M protection frequency slots of slot widths corresponding to the M greatest different slot widths of the L different slot widths to the M protection paths, if M=L, allocating M protection frequency slots of slot widths corresponding to the L different slot widths to the M protection paths, and if M>L, allocating L protection frequency slots of slot widths corresponding to the L different slot widths to L of the M protection paths and M−L additional protection frequency slots of slot widths corresponding to at least one of the L different slot widths to the remaining M−L protection paths, and effecting provisioning of the M protection paths for supporting recovery from the failures.

In some embodiments, the method further includes comparing M to L to determine a satisfied one of the conditions, wherein the allocating includes carrying out allocation of the protection frequency slots to the M protection paths according to the satisfied one of the conditions.

In some embodiments, the allocating includes automatically allocating the protection frequency slots to the M protection paths. In other embodiments, the allocating includes allocating the protection frequency slots to the M protection paths in response to one of an externally generated instruction and an externally generated message.

In some embodiments, the method further includes identifying a working path of the set of N working paths in which a failure occurs as a failed working path, selecting one of the M protection paths for use in recovering from the failure in the failed working path, determining whether a frequency slot allocated to the failed working path is narrower than a protection frequency slot allocated to the selected protection path, and effecting provisioning of only a first sub-slot of the protection frequency slot allocated to the selected protection path that has a slot width corresponding to a slot width of the failed working path for supporting recovery from the failure in the failed working path in response to a determination that the frequency slot allocated to the failed working path is narrower than the protection frequency slot allocated to the selected protection path.

In further embodiments, the method further includes determining, in response to the determination that the frequency slot allocated to the failed working path is narrower than the protection frequency slot allocated to the selected protection path, whether a second sub-slot of the protection frequency slot allocated to the selected protection path which is not used for supporting recovery from the failure in the failed working path is sufficient for utilization by one of a separate working path and a separate protection path, and effecting provisioning of the second sub-slot of the protection frequency slot allocated to the selected protection path to the one of the separate working path and the separate protection path in response to a determination that the second sub-slot of the protection frequency slot allocated to the selected protection path is sufficient for utilization by the one of the separate working path and the separate protection path.

In some embodiments, the method further includes detecting an upgrade enabling utilization of J frequency slots that are wider than the widest frequency slot of the N frequency slots allocated to the N working paths before the upgrade, where J is a positive integer greater than or equal to one, and reallocating the protection frequency slots to take account of the upgrade, the reallocating including if J≥M, increasing slot widths of the M protection frequency slots to correspond to slot widths of the M widest frequency slots of the J frequency slots that are wider than the widest frequency slot of the N frequency slots allocated to the N working paths before the upgrade, and if J<M, increasing slot widths of J of the M protection frequency slots to correspond to slot widths of the J frequency slots that are wider than the widest frequency slot of the N frequency slots allocated to the N working paths before the upgrade.

There is also provided in accordance with yet a further embodiment of the present invention an elastic optical network (EON) including a plurality of network elements (NEs), a set of N working paths over which the NEs communicate with one another, the N working paths being allocated N frequency slots of L different slot widths, and M protection paths operative to protect communication over the working paths and having the following protection frequency slots allocated thereto: if M<L, M protection frequency slots of slot widths corresponding to the M greatest different slot widths of the L different slot widths, if M=L, M protection frequency slots of slot widths corresponding to the L different slot widths, and if M>L, L protection frequency slots of slot widths corresponding to the L different slot widths and M−L additional protection frequency slots of slot widths corresponding to at least one of the L different slot widths, wherein N, L, and M are positive integers, N≥L>1, and N>M>1.

In some embodiments, the EON further includes a network control and management system (NCMS) operative to allocate the N frequency slots of L different slot widths to the N working paths and the M protection frequency slots to the M protection paths. In other embodiments, one of the NEs is operative to allocate the N frequency slots of L different slot widths to the N working paths and the M protection frequency slots to the M protection paths.

In some embodiments, the EON further includes a control plane via which the N working paths and the M protection paths are provisioned.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
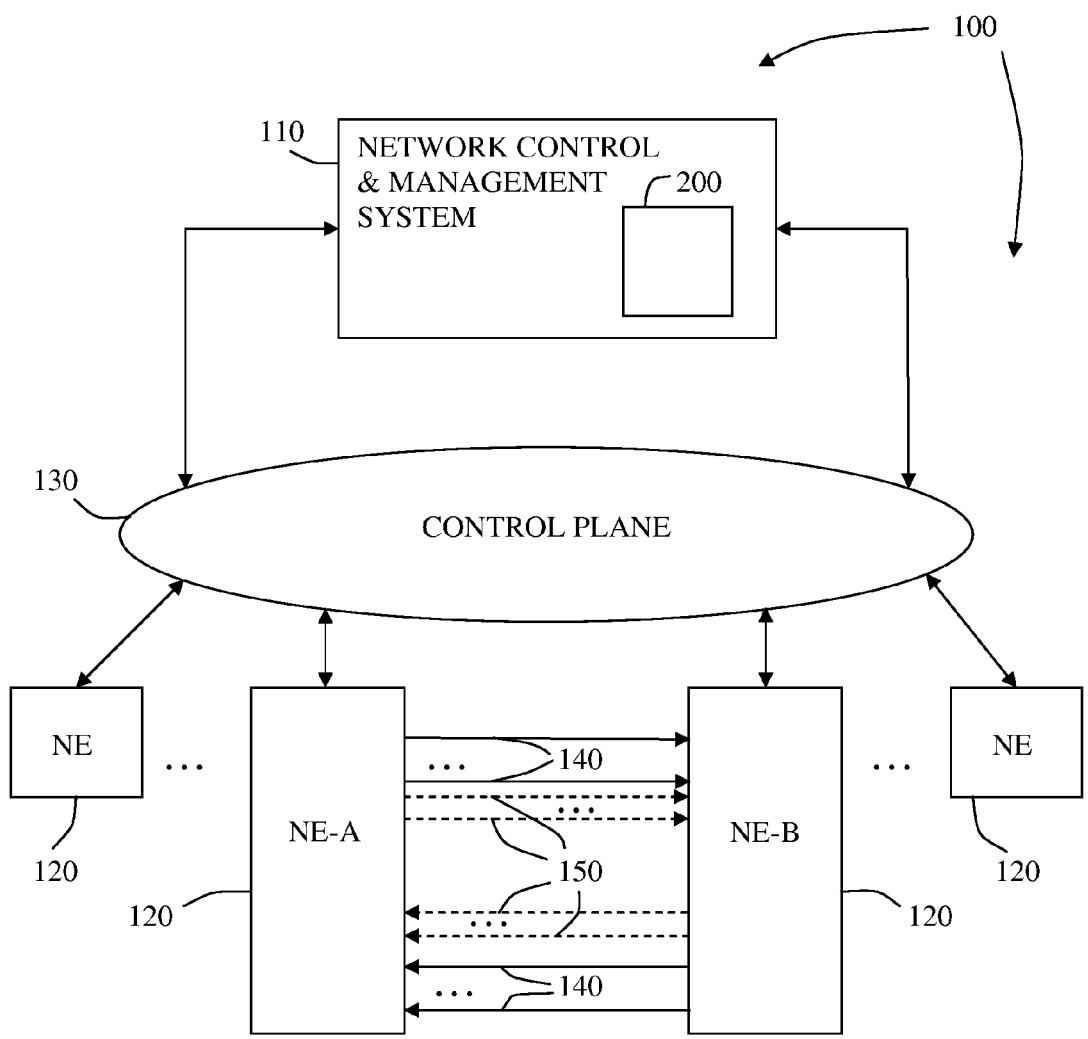
FIG. 1 is a simplified block diagram illustration of an elastic optical network (EON) constructed and operative in accordance with an embodiment of the present invention.

Reference is now made to FIG. 1, which is a simplified block diagram illustration of an elastic optical network (EON) constructed and operative in accordance with an embodiment of the present invention.

The EON of FIG. 1, which is generally designated 100, includes a network control and management system (NCMS) 110 and a plurality of network elements (NEs) 120 at nodes (not shown) of the EON 100. The NCMS 110 is operatively associated with the NEs 120 and is operative to control the NEs 120, typically via a control plane 130 using, for example, routing and signaling control modules (not shown). The control plane 130 may further be used in responding to requests, selections and control instructions generated by the NCMS 110 and/or one or more of the NEs 120.

For simplicity of depiction and description, the NCMS 110 is shown in FIG. 1 and referred to below as a unit which is separate from the NEs 120, but in some embodiments, the NCMS 110 may form one of the NEs 120 or be comprised in one of the NEs 120.

The NEs 120 are operative to communicate with one another over a set of N working paths 140 that are allocated N frequency slots of L different slot widths, where N and L are positive integers, and NL>1. The N working paths 140 may be provisioned by the NCMS 110 or one of the NEs 120, typically via the control plane 130, and the N frequency slots of L different slot widths may be allocated to the N working paths 140 by the NCMS 110 or the one of the NEs 120, respectively. The EON 100 also uses or is configured to use one or more protection paths 150 for protecting communication over the working paths 140.

By way of a non-limiting example, the NEs 120 may include routers and/or reconfigurable optical add-drop multiplexers (ROADMs).

In accordance with an embodiment of the present invention the EON 100 further includes apparatus 200 for enabling recovery from one or more failures in one or more of the N working paths 140. The one or more failures in one or more of the N working paths 140 may, for example, occur due to an interference effect or malfunction of one or more optical transmitters (not shown) transmitting optical signals over working paths 140 associated therewith.

The apparatus 200 may be comprised in or associated with the NCMS 110 or one of the NEs 120. By way of a non-limiting example, in FIG. 1 the apparatus 200 is shown as being included in the NCMS 110.

In a case where the apparatus 200 is not comprised in the NCMS 110, such as when the apparatus 200 is a stand-alone unit or comprised in one of the NEs 120, the NCMS 110 and the NEs 120 may communicate with the apparatus 200 via the control plane 130, and the apparatus 200 may operate under instructions from the NCMS 110, or under instructions from any one of the NEs 120, or under instructions from both any one of the NEs 120 and the NCMS 110.

In a case where the apparatus 200 is comprised in the NCMS 110, operations attributed herein to the apparatus 200 may be viewed as being consequently performed by the NCMS 110. In a case where the apparatus 200 is comprised in one of the NEs 120, operations attributed herein to the apparatus 200 may be viewed as being consequently performed by the one of the NEs 120.

For simplicity of description and depiction, only sections of the working paths 140 and the protection paths 150 between a first NE 120 and a second NE 120, designated NE-A and NE-B, respectively, are shown in FIG. 1, but it is appreciated that the working paths 140 and the protection paths 150 may include additional sections, such as, by way of a non-limiting example, sections along a chain of linked NEs 120 including NE-A and NEs 120 other than NE-B, and sections along a chain of linked NEs 120 including NE-B and NEs 120 other than NE-A.

The working paths 140 may include unidirectional working paths 140 from NE-A to NE-B and unidirectional working paths 140 from NE-B to NE-A, and the protection paths 150 may include unidirectional protection paths 150 from NE-A to NE-B and unidirectional protection paths 150 from NE-B to NE-A, as depicted, by way of a non-limiting example, in FIG. 1. In communication from NE-A to NE-B, NE-A acts as an ingress node and NE-B acts as an egress node, and in communication from NE-B to NE-A, NE-B acts as an ingress node and NE-A acts as an egress node.

Alternatively, one or more of the working paths 140 and one or more of the protection paths 150 may include bidirectional paths.

In some embodiments, one or more of the protection paths 150 may include a backup label switched path (LSP).

Although referred to as protection paths, it is appreciated that at least one of the protection paths 150 may alternatively be used for restoration, in which case the at least one of the protection paths 150 includes a restoration path.

The N frequency slots of L different slot widths are frequency slots of a flexibly allocated optical spectrum which the EON 100 uses or is configured to use in order to enable mixed modulation format transmission or mixed bit rate transmission with some bit rates for which fixed slot width slots do not fit, or at least do not easily fit. In a case where the L different slot widths are intended for mixed bit rate transmission, the N frequency slots of L different slot widths may be used for L different bit rates, or for more than L different bit rates with frequency slots of similar slot widths being used for two or more appropriate different bit rates.

In some embodiments, the N working paths 140 are allocated the N frequency slots of L different slot widths for use with at least L different bit rates which include at least two of the following bit rates: substantially 100 Gb/s; substantially 400 Gb/s; and substantially 1 Terabit per second (Tb/s) (1 Tb/s equals 1000 Gb/s).

Throughout the present specification and claims, the term "substantially", when used in conjunction with a specified bit-rate, refers to the specified bit rate or to approximately the specified bit rate. Thus, the term "substantially 100 Gb/s" refers to a bit rate of 100 Gb/s or approximately 100 Gb/s, the term "substantially 400 Gb/s" refers to a bit rate of 400 Gb/s or approximately 400 Gb/s, the term "substantially 1000 Gb/s" or "substantially 1 Tb/s" refers to a bit rate of 1000 Gb/s (1 Tb/s) or approximately 1 Tb/s, and so forth. For example, which is not meant to be limiting, the bit rate of substantially 100 Gb/s may be 103.125 Gb/s, which is greater than 100 Gb/s. Further for example, which is not meant to be limiting, the bit rate of substantially 400 Gb/s may be four times the bit rate of substantially 100 Gb/s, and in a case where the bit rate of substantially 100 Gb/s is greater than 100 Gb/s the bit rate of substantially 400 Gb/s is greater than 400 Gb/s.

In some embodiments, the L different slot widths may include at least two of the following slot widths: 50 Gigahertz (GHz); 75 GHz; and 150 GHz. By way of a non-limiting example, a frequency slot of a slot width of 50 GHz may be usable for a bit rate of substantially 100 Gb/s as well as for lower bit rates, such as a bit rate of 40 Gb/s, a frequency slot of a slot width of 75 GHz may be usable for a bit rate of substantially 400 Gb/s, and a frequency slot of a slot width of 150 GHz may be usable for a bit rate of substantially 1 Tb/s.

In some embodiments, the N frequency slots of L different slot widths may include frequency slots of a flexible dense wavelength division multiplexing (DWDM) grid according to Edition 2.0 of the International Telecommunication Union (ITU) Recommendation ITU-T G.694.1 (February 2012). In other embodiments, the N frequency slots of L different slot widths may include frequency slots that are flexibly allocated, but not according to the flexible DWDM grid according to Edition 2.0 of the ITU Recommendation ITU-T G.694.1 (February 2012). In still other embodiments, the N frequency slots of L different slot widths may include a combination of some frequency slots of the flexible DWDM grid according to Edition 2.0 of the ITU Recommendation ITU-T G.694.1 (February 2012) and some frequency slots that are flexibly allocated, but not according to the flexible DWDM grid according to Edition 2.0 of the ITU Recommendation ITU-T G.694.1 (February 2012).

In some embodiments, the flexible DWDM grid may span or be within ITU specified C band. In other embodiments, the flexible DWDM grid may span or be within other ITU specified bands, such as ITU specified S or L bands.

The EON 100 may be directly configured as an EON utilizing the flexibly allocated optical spectrum, or evolve from an optical network that initially uses a fixed DWDM grid and then at some point is at least partially upgraded and consequently reconfigured to utilize a flexibly allocated optical spectrum, at least in communication among some of the NEs 120. The apparatus 200 may, for example, be installed in the EON 100 and/or operated in the EON 100 as part of such upgrade and reconfiguration.

In operation, the NCMS 110 or one of the NEs 120, such as, by way of a non-limiting example, NE-A or NE-B, may allocate the N frequency slots of L different slot widths to the working paths 140 and provision the working paths 140 via the control plane 130, and employ the apparatus 200 in applying a recovery scheme for use in the EON 100.

The apparatus 200 is operative to take account of the L different slot widths of the N allocated frequency slots upon application of and/or in connection with application of any one of various recovery schemes. Non-limiting examples of the various recovery schemes include the following: an M:N recovery scheme; a 1:N recovery scheme; a 1+1 recovery scheme; a 1:1 recovery scheme; and a dynamic recovery scheme.

In the M:N recovery scheme, the N working paths 140 are protected by M protection paths 150, where M is a positive integer, and N>M>1.

In the 1:N recovery scheme, the N working paths 140 are protected by one protection path 150.

In the 1+1 recovery scheme, as well as in the 1:1 recovery scheme, each working path 140 is backed up by one protection path 150, and therefore the N working paths 140 are backed up by N protection paths 150. The working paths 140 and the protection paths 150 may be provisioned over the same link which may include, for example, an optical fiber (not shown), or over separate links having common ingress and egress nodes, for example in order to enable recovery from failures in all of the N working paths 140. Failures in all the N working paths 140 may, for example, occur when a failure occurs in an entire link over which the N working paths 140 are provisioned, such as when the link is disconnected due to, for example, an optical fiber cut.

In 1+1 recovery, normal traffic is duplicated at an ingress node and one copy is transmitted to an egress node over a working path 140 and another copy is transmitted to the egress node over a protection path 150 associated with the working path 140. The egress node forwards only one copy of the traffic to a destination so that if a failure occurs in one of the working path 140 and the associated protection path 150, the egress node forwards the copy from the unfailing path, which becomes the actual protection path. In 1:1 recovery, normal traffic is transferred from the working path 140 to the associated protection path 150 when a failure occurs in the working path 140.

In the dynamic recovery scheme, no protection path is provisioned in advance, and operations to attain recovery are carried out dynamically upon reporting of a failure.

The apparatus 200 may apply any selected one of the various recovery schemes, or operate in response to a signaled instruction resulting from application of the selected one of the various recovery schemes or a signaled input indicating application of the selected one of the various recovery schemes. The signaled instruction or signaled input may be received at the apparatus 200 from a network operator (not shown), from the NCMS 110, from the one of the NEs 120, or from network equipment (not shown) located outside the apparatus 200, for example upon installation of the apparatus 200 or at a later stage.

When the NCMS 110 or the one of the NEs 120 uses the apparatus 200 in applying an M:N recovery scheme, the apparatus 200 allocates M protection frequency slots to M protection paths 150 as follows:

(a) If M<L, the apparatus 200 allocates M protection frequency slots of slot widths corresponding to the M greatest different slot widths of the L different slot widths to the M protection paths 150, (b) If M=L, the apparatus 200 allocates M protection frequency slots of slot widths corresponding to the L different slot widths to the M protection paths 150, and (c) If M>L, the apparatus 200 allocates L protection frequency slots of slot widths corresponding to the L different slot widths to L of the M protection paths 150 and further allocates M–L protection frequency slots of slot widths corresponding to at least one of the L different slot widths to the remaining M–L protection paths 150.

After the apparatus 200 allocates the M protection frequency slots to the M protection paths 150 the apparatus 200 effects provisioning of the M protection paths 150. The term "effecting provisioning", in all of its grammatical forms, is used throughout the present specification and claims to include actual performance of provisioning or causing provisioning to be performed, such as by transmitting an instruction to perform provisioning. Consequently, the apparatus 200 or the NCMS 110 or the one of the NEs 120 provisions the M protection paths 150, and possibly related resources, such as optical transceivers (not shown) suitable for communication over the M protection paths 150, via the control plane 130 for supporting recovery from failures in up to M of the N working paths 140. Thereafter, when failures are identified in K of the N working paths 140, that is K of the N working paths 140 are identified as failed working paths 140, where K is a positive integer such that 1≤K≤M, the apparatus 200 determines slot widths of the K failed working paths 140, and the one of the NEs 120 or the NCMS 110 selects and uses K of the M protection paths 150 which have slot widths corresponding to slot widths of the K failed working paths 140 for recovering from the failures.

When the NCMS 110 or the one of the NEs 120 uses the apparatus 200 in applying a 1:N recovery scheme, the apparatus 200 allocates one protection frequency slot of a slot width which is substantially equal to or greater than a slot width of the widest frequency slot of the N frequency slots to one protection path 150, and effects provisioning of the one protection path 150. Consequently, the apparatus 200 or the NCMS 110 or the one of the NEs 120 provisions the one protection path 150, and possibly related resources, such as optical transceivers (not shown) suitable for communication over the one protection path 150, via the control plane 130 for supporting recovery from a failure. Thereafter, when one of the N working paths 140 is identified as a failed working path 140, the NCMS 110 or the one of the NEs 120 uses the one protection path 150 for recovering from the failure.

When the NCMS 110 or the one of the NEs 120 uses the apparatus 200 in applying a 1+1 recovery scheme or a 1:1 recovery scheme, the apparatus 200 allocates N protection frequency slots of slot widths corresponding to the slot widths of the N working paths 140 to N protection paths 150, respectively associates each working path 140 with a protection path 150 having a slot width which is similar to a slot width of the associated working path 140, and effects provisioning of the N protection paths 150. Consequently, the apparatus 200 or the NCMS 110 or the one of the NEs 120 provisions the N protection paths 150, and possibly related resources, such as optical transceivers (not shown) suitable for communication over the N protection paths 150, via the control plane 130 for supporting recovery from failures in up to N of the N working paths 140. Thereafter, if a 1+1 recovery scheme is applied and one of the N working paths 140 is identified as a failed working path 140, the NCMS 110 or the one of the NEs 120 instructs an NE 120 acting as an egress node associated with the failed working path 140 to forward a copy of traffic carried over the protection path 150 associated with the failed working path 140 to a destination. If a 1:1 recovery scheme is applied and one of the N working paths 140 is identified as a failed working path 140, the NCMS 110 or the one of the NEs 120 instructs an NE 120 acting as an ingress node associated with the failed working path 140 to transfer normal traffic from the failed working path 140 to the protection path 150 associated with the failed working path 140.

When the NCMS 110 or the one of the NEs 120 uses the apparatus 200 in applying a dynamic recovery scheme, the apparatus 200 stands by to receive, for example from an NE 120, a failure indication message indicating a failed working path 140. Upon receipt of the failure indication message, the apparatus 200 checks a slot width of the failed working path 140 to determine slot width thereof, allocates a protection frequency slot of a slot width which is substantially equal to the slot width of the failed working path 140 to a protection path 150, and effects provisioning of the protection path 150. Consequently, the apparatus 200 or the NCMS 110 or the one of the NEs 120 provisions the protection path 150, and possibly related resources, such as optical transceivers (not shown) suitable for communication over the protection path 150, via the control plane 130 for supporting recovery from the failure, and instructs affected NEs 120 to use the protection path 150 instead of the failed working path 140. Such a process leading to provisioning of the protection path 150 may be dynamically repeated for additional protection paths 150 when additional working paths 140 fail.

In some embodiments, the EON 100 supports a plug-and-play mode. In the plug-and-play mode, the NCMS 110 or the apparatus 200 monitors the control plane 130 to automatically detect installation of equipment in the EON 100 or an upgrade to existing equipment in the EON 100, and automatically allocates frequency slots to the working paths 140 after installation of the equipment or automatically reallocates frequency slots to the working paths 140 after the upgrade if such reallocation is to be effected. Assuming one of the recovery schemes mentioned above is applied, the apparatus 200 automatically operates in a manner as described above regarding the applied recovery scheme. Non-limiting examples of such equipment that may be installed or upgraded in the EON 100 include NEs or optical devices within NEs, such as optical transceivers.

Figure 2:
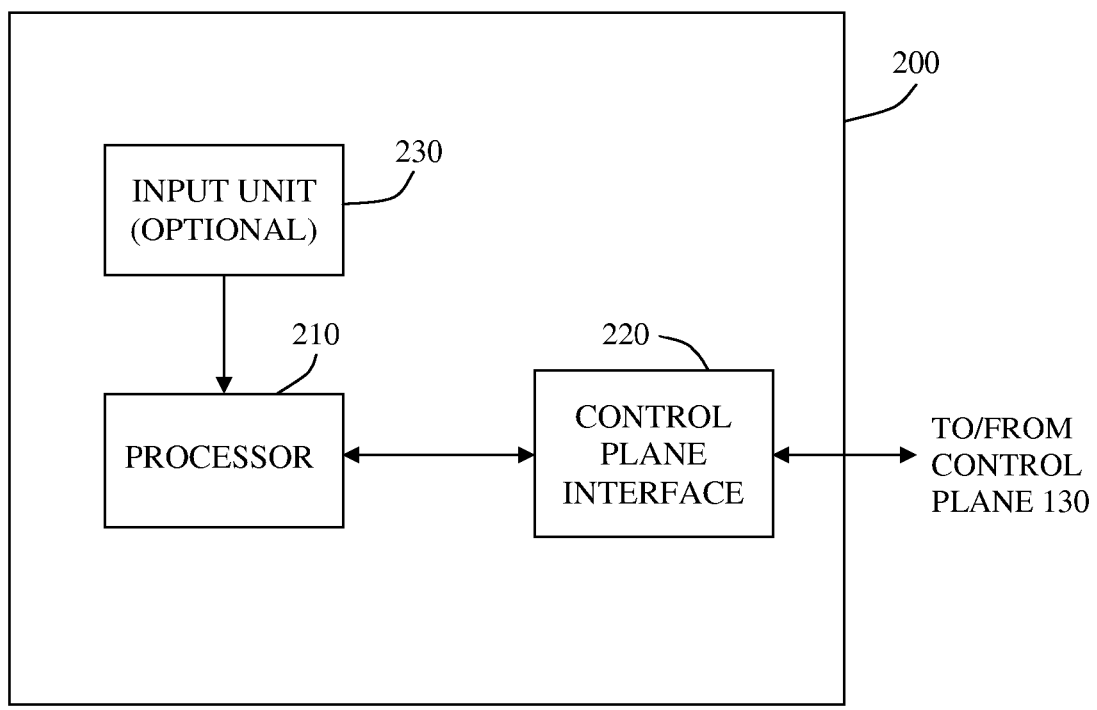
FIG. 2 is a simplified block diagram illustration of apparatus in the EON of FIG. 1 for enabling recovery from one or more failures, the apparatus being constructed and operative in accordance with an embodiment of the present invention.

Reference is now additionally made to FIG. 2, which is a simplified block diagram illustration of the apparatus 200 of FIG. 1, the apparatus 200 being constructed and operative in accordance with an embodiment of the present invention.

The apparatus 200 includes a processor 210 and a control plane interface 220. The control plane interface 220 is operatively associated with the processor 210. The processor 210 is operative to allocate one or more protection frequency slots to one or more protection paths 150, and the control plane interface 220 is operative to effect provisioning of the one or more protection paths 150 for supporting recovery from one or more failures.

The term "processor" is used throughout the present specification and claims to include any type of computational device with built-in or associated memory subsystem and input/output (I/O) subsystem/interface and capable of performing functions attributed to or associated with the processor, such as, but not limited to, one or more of the following devices or combinations thereof: a microprocessor; a processor; a controller; a field programmable gate array (FPGA); a programmable logic device (PLD); and an application-specific integrated circuit (ASIC).

In some embodiments, the apparatus 200 further includes an input unit 230 as depicted, by way of a non-limiting example, in FIG. 2. The input unit 230 is operatively associated with the processor 210 and is operative to receive one or more instructions or messages for use by the processor 210.

In some other embodiments, the input unit 230 may be located outside the apparatus 200 and be operatively associated therewith.

The control plane interface 220 may be implemented in software or in hardware, or in a combination of software and hardware. The control plane interface 220 may be integrated with the processor 210 and implemented, by way of a non-limiting example, in one or more integrated circuits (ICs).

In some embodiments, a table with a list of the N working paths 140, a list of the N frequency slots allocated to the N working paths 140, and a list of slot widths of the N frequency slots may be produced, for example by the processor 210, and implemented as a look-up table (LUT). The LUT may be stored in a memory subsystem (not shown) of the processor 210 or in an external storage device (not shown) accessible by the processor 210. The processor 210 may read and retrieve information from the LUT, and may write information into and change entries in the LUT, for example as a result of computations performed by the processor 210. In embodiments in which the LUT is implemented, the processor 210 may determine a slot width of any one of the N working paths 140 by consulting the LUT, and may use one or more determined slot width values for various computations and/or provide the one or more determined slot width values to the NCMS 110 or to one or more of the NEs 120, for example via the control plane 130.

In accordance with an embodiment of the present invention, which may particularly, but not only, be useful for M:N recovery, the apparatus 200 is operative to enable recovery from failures in up to M working paths 140 of the set of N working paths 140. In order to enable such recovery, the processor 210 allocates protection frequency slots to M protection paths 150, and the control plane interface 220 effects provisioning of the M protection paths 150 for supporting recovery from the failures. The processor 210 is operative to allocate the protection frequency slots to the M protection paths 150 in different manners depending on whether M is greater than L, equal to L or less than L. Specifically, the processor 210 is operative to allocate the protection frequency slots to the M protection paths 150 as follows:

(a) If M<L, to allocate M protection frequency slots of slot widths corresponding to the M greatest different slot widths of the L different slot widths to the M protection paths 150, (b) If M=L, to allocate M protection frequency slots of slot widths corresponding to the L different slot widths to the M protection paths 150, and (c) If M>L, to allocate L protection frequency slots of slot widths corresponding to the L different slot widths to L of the M protection paths 150, and to allocate M−L additional protection frequency slots of slot widths corresponding to at least one of the L different slot widths to the remaining M-L protection paths 150.

In some embodiments, the processor 210 may first compare M to L to determine a satisfied one of the conditions, and then carry out allocation of the M protection frequency slots to the M protection paths 150 according to the satisfied one of the conditions.

In some embodiments, when the condition M<L is satisfied, the processor 210 may compute the M greatest different slot widths of the L different slot widths, for example by comparing the L different slot widths to one another and obtaining a result comprising the M greatest different slot width values.

In some embodiments, the processor 210 may allocate the M protection frequency slots to the M protection paths 150 automatically. In other embodiments, the processor 210 may allocate the M protection frequency slots to the M protection paths 150 in response to an externally generated instruction or message that may be received, for example from the NCMS 110 or from one of the NEs 120, at an I/O subsystem/interface (not shown) of the processor 210, or at the input unit 230 in embodiments in which the input unit 230 is used.

In some embodiments, the control plane interface 220 may effect provisioning of the M protection paths 150 automatically following allocation of the M protection frequency slots by the processor 210. In some other embodiments, the control plane interface 220 may effect provisioning of the M protection paths 150 in response to a message or instruction provided by the processor 210.

The frequency slots allocated to the N working paths 140 may change over time, for example, due to an upgrade causing modification of one or more of the frequency slots allocated to the working paths 140. Such an upgrade may cause such a modification by, for example, enabling utilization, for one or more of the working paths 140, of one or more frequency slots that are wider than a current widest frequency slot of the N frequency slots. By way of a non-limiting example, the upgrade may include one or more of the following: an upgrade of the EON 100; an upgrade of at least one of the NEs 120; an upgrade of at least one optical device in at least one of the NEs 120; and an upgrade of an optical device in the EON 100. By way of a non-limiting example, the upgrade may include an upgrade to enable communication at a faster bit rate than a bit rate of communication before the upgrade.

In some embodiments, when such an upgrade occurs, the processor 210 detects occurrence of the upgrade or receives an indication of occurrence of the upgrade, for example from the NCMS 110, and then checks to detect if the upgrade enables utilization of frequency slots that are wider than the widest frequency slot of the N frequency slots before the upgrade. If the upgrade enables utilization of J such frequency slots that are wider than the widest frequency slot of the N frequency slots before the upgrade for J or more working paths 140, where J is a positive integer greater than or equal to one, the processor 210 may reallocate the protection frequency slots to take account of the upgrade. If J≥M, such reallocation may be performed by increasing slot widths of the M protection frequency slots to correspond to slot widths of the M widest frequency slots of the J frequency slots that are wider than the widest frequency slot of the N frequency slots before the upgrade, and if J<M, such reallocation may be performed by increasing slot widths of J of the M protection frequency slots to correspond to slot widths of the J frequency slots that are wider than the widest frequency slot of the N frequency slots before the upgrade. It is appreciated that if the upgrade does not enable utilization of frequency slots that are wider than the widest frequency slot of the N frequency slots before the upgrade, the processor 210 may, for example, determine that no reallocation of the protection frequency slots is to be effected.

In one embodiment, the processor 210 may detect occurrence of the upgrade automatically.

By reallocating the protection frequency slots to take account of an upgrade that enables utilization of frequency slots that are wider than the widest frequency slot before the upgrade, the apparatus 200 provides an adaptable capability of enabling an M:N recovery scheme.

In some embodiments, one or more of the M protection frequency slots may be used in separate sub-slots, that is, for at least one of the M protection frequency slots only a sub-slot of the protection frequency slot is used for protecting one working path 140, thereby leaving residue bandwidth of the protection frequency slot which may be available for other uses. For example, the processor 210 may receive from one of the NEs 120 a failure indication message identifying a failed working path 140, and the one of the NEs 120 may select one of the M protection paths 150 for use in recovering from the failure in the failed working path 140 and inform the processor 210 of the selected protection path 150. The processor 210 may then determine whether a frequency slot allocated to the failed working path 140 is narrower than a protection frequency slot allocated to the selected protection path 150. In response to a determination that the frequency slot allocated to the failed working path 140 is narrower than the protection frequency slot allocated to the selected protection path 150, the control plane interface 220 may effect provisioning of only a first sub-slot of the protection frequency slot allocated to the selected protection path 150 that has a slot width corresponding to a slot width of the failed working path 140 for supporting recovery from the failure in the failed working path 140, thereby leaving residue bandwidth of the selected protection path 150 which may be available for other uses. By way of a non-limiting example, if a frequency slot allocated to the failed working path 140 has a slot width of 50 GHz, and the one of the NEs 120 selects a protection path 150 that has an allocated protection frequency slot of a 150 GHz slot width because no other protection path 150 with a narrower protection frequency slot is currently available, the processor 210 may determine the first sub-slot of the protection frequency slot of the selected protection path 150 as a sub-slot of a 50 GHz slot width and instruct the control plane interface 220 to effect provisioning of only the first sub-slot of the protection frequency slot of the selected protection path 150 for supporting recovery from the failure in the failed working path 140, thereby leaving 100 GHz of the protection frequency slot allocated to the selected protection path 150 as available residue bandwidth.

In further embodiments, the processor 210 may further determine, in response to the determination that the frequency slot allocated to the failed working path 140 is narrower than the protection frequency slot allocated to the selected protection path 150, whether a second sub-slot of the protection frequency slot allocated to the selected protection path 150 which is not used for supporting recovery from the failure in the failed working path 140 is sufficient for utilization by one of a separate working path 140 and a separate protection path 150. The second sub-slot of the protection frequency slot allocated to the selected protection path 150 may include the entire residue bandwidth of the selected protection path 150 or a portion thereof. In response to a determination that the second sub-slot of the protection frequency slot allocated to the selected protection path 150 is sufficient for utilization by the one of the separate working path 140 and the separate protection path 150, the control plane interface 220 may effect provisioning of the second sub-slot of the protection frequency slot allocated to the selected protection path 150 to the one of the separate working path 140 and the separate protection path 150. In the above-mentioned example in which 100 GHz of the protection frequency slot allocated to the selected protection path 150 remains as available residue bandwidth, the processor 210 may, for example, determine the second sub-slot of the protection frequency slot allocated to the selected protection path 150 as a sub-slot of a 75 GHz slot width of the available residue bandwidth of the selected protection path 150, and reallocate the second sub-slot of the protection frequency slot allocated to the selected protection path 150 to a new, separate working path 140.

Such use in separate sub-slots may be repeated for additional protection paths 150 when additional working paths 140 fail.

In the embodiments in which the one or more of the M protection frequency slots may be used in separate sub-slots there may be a case in which available residue bandwidth of one protection frequency slot is insufficient for a separate working path 140 or a separate protection path 150, but combined available residue bandwidth of two or more protection frequency slots is sufficient for the separate working path 140 or the separate protection path 150. When occurrence of such a case is determined by the processor 210, the processor 210 may reallocate the combined available residue bandwidth of two or more protection frequency slots to the separate working path 140 or the separate protection path 150.

It is appreciated that when protection frequency slots are used in separate sub-slots, related resources which are suitable for use with the separate sub-slots may also be provisioned, typically by the NCMS 110 or by the one of the NEs 120.

It is further appreciated that when protection frequency slots are used in separate sub-slots and available residue bandwidth of one or more protection frequency slots is reallocated to one or more separate protection paths 150, the actual number of protection paths 150 increases. In the above-mentioned example in which 100 GHz of the protection frequency slot allocated to the selected protection path 150 remains as available residue bandwidth, the processor 210 may, for example, allocate the second sub-slot to one separate protection path 150 instead of to the separate working path 140, thereby increasing the actual number of protection paths 150 by one, or may even allocate two sub-slots of the available residue bandwidth, each of 50 GHz slot width, to two separate protection paths 150, thereby increasing the actual number of protection paths 150 by two. In a case where a reversion procedure may be applied to transfer normal traffic from the selected protection path 150 back to the failed working path 140 after the failure in the failed working path 140 is repaired, allocation and utilization of the residue bandwidth may be terminated substantially when the reversion procedure is applied so as to enable the selected protection path 150 to return to its full capacity of protecting any working path 140 having a frequency slot which is narrower than or of the width of the protection frequency slot allocated to the selected protection path 150, and at such stage the actual number of protection paths 150 returns to be M.

Figure 3:
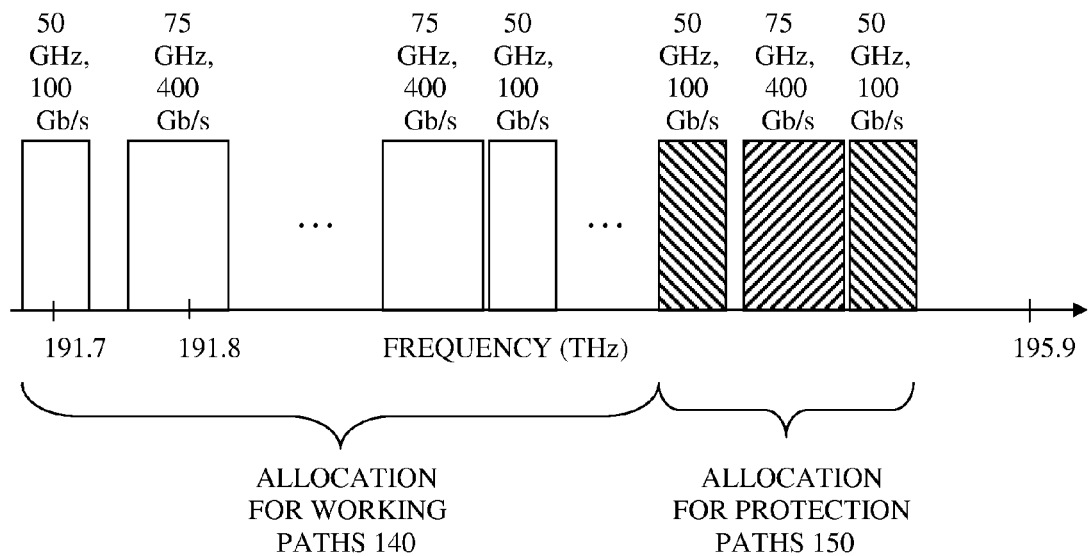
FIG. 3 is a diagram illustrating a prospective example of frequency allocation usable with the EON of FIG. 1 and the apparatus of FIG. 2 and with an M:N recovery scheme, in accordance with an embodiment of the present invention.

As mentioned above, the embodiment in which the apparatus 200 is operative to enable recovery from failures in up to M working paths 140 of the set of N working paths 140 may particularly be useful for M:N recovery, and a prospective example of frequency allocation applicable to such embodiment and usable with the EON 100 and the apparatus 200 and with an M:N recovery scheme is illustrated in FIG. 3, to which reference is now additionally made.

In the example of frequency allocation of FIG. 3, which is not meant to be limiting, L=2, M=3, and the N working paths 140 are allocated frequency slots of a 50 GHz slot width for communication at a bit rate of substantially 100 Gb/s, and frequency slots of a 75 GHz slot width for communication at a bit rate of substantially 400 Gb/s. In accordance with the embodiment in which the apparatus 200 is operative to enable recovery from failures in up to M working paths 140 of the set of N working paths 140, and since M>L, a protection frequency slot of a 50 GHz slot width is allocated to a first one of the three protection paths 150, a protection frequency slot of a 75 GHz slot width is allocated to a second one of the three protection paths 150, and, by way of a non-limiting example, a protection frequency slot of a 50 GHz slot width may be allocated to the remaining third protection path 150.

In FIG. 3, the N frequency slots allocated to the N working paths 140 and the M protection frequency slots are depicted, by way of a non-limiting example, as being separated by frequency ranges that are unallocated. An unallocated frequency range separating two allocated frequency slots is referred to as a guard band. The guard bands in FIG. 3 are depicted as being of various widths and narrower than the frequency slots, but it is appreciated that the guard bands may be of fixed widths and/or of widths which may, by way of a non-limiting example, be similar to or greater than a slot width of any one of the frequency slots. It is further appreciated that only some of the frequency slots of the working paths 140 and/or the protection paths 150 may alternatively be separated by guard bands. Further alternatively, the frequency slots may be allocated to the N working paths 140 and the M protection paths 150 without using any guard bands between frequency slots.

In the example of frequency allocation of FIG. 3 a slot width of the widest frequency slot is 75 GHz. By way of a non-limiting example, if, in the example of frequency allocation of FIG. 3, an upgrade occurs, which upgrade enables utilization of a frequency slot of a 150 GHz slot width for one of the working paths 140 being allocated a frequency slot of a 50 GHz slot width before the upgrade, the processor 210 may, for example, increase slot width of the third protection path 150 to a slot width of 150 GHz. However, if the upgrade does not enable utilization of a frequency slot that is wider than the widest frequency slot before the upgrade, but rather enables, for example, utilization of a frequency slot of a 75 GHz slot width for the one of the working paths 140 being allocated a frequency slot of a 50 GHz slot width before the upgrade, the processor 210 may determine that no reallocation of the protection frequency slots is to be effected because the second one of the three protection paths 150 has an allocated protection frequency slot of a 75 GHz slot width and can thus be suitable for protecting any one of the working paths 140 being allocated a frequency slot of a slot width which is less than or equal to 75 GHz.

Referring now back to FIG. 2, in accordance with another embodiment of the present invention, which may particularly, but not only, be useful for 1:N recovery, the apparatus 200 is operative to enable recovery from a failure in any one working path 140 of the set of N working paths 140. In order to enable such recovery, the processor 210 allocates a protection frequency slot of a slot width which is substantially equal to or greater than a slot width of the widest frequency slot of the N frequency slots to a protection path 150, and the control plane interface 220 effects provisioning of the protection path 150 for supporting recovery from the failure.

In some embodiments, the processor 210 may allocate the protection frequency slot to the protection path 150 automatically. In other embodiments, the processor 210 may allocate the protection frequency slot to the protection path 150 in response to an externally generated instruction or message that may be received, for example from the NCMS 110 or from one of the NEs 120, at the I/O subsystem/interface of the processor 210, or at the input unit 230 in embodiments in which the input unit 230 is used. The externally generated instruction or message may include, or be accompanied by, one of an instruction to compute the widest frequency slot of the N frequency slots and an input indicating the widest frequency slot of the N frequency slots. It is appreciated that the processor 210 may compute the widest frequency slot of the N frequency slots, for example by comparing slot widths of the N frequency slots to one another and obtaining a result comprising the greatest slot width value.

In some embodiments, the control plane interface 220 may effect provisioning of the protection path 150 automatically following allocation of the protection frequency slot by the processor 210. In some other embodiments, the control plane interface 220 may effect provisioning of the protection path 150 in response to a message or instruction provided by the processor 210.

In some embodiments, in order to allocate the protection frequency slot, the widest frequency slot of the N frequency slots is first determined, for example by the processor 210, and the protection frequency slot is then allocated to the protection path 150 in response to a determination of the widest frequency slot of the N frequency slots. In one embodiment, the widest frequency slot of the N frequency slots is determined automatically. In embodiments in which the LUT is implemented, the processor 210 may determine the widest frequency slot of the N frequency slots from the LUT.

The widest frequency slot of the N frequency slots allocated to the working paths 140 may change over time, for example, due to an upgrade of the type mentioned above in connection with the embodiment in which the apparatus 200 is operative to enable recovery from failures in up to M working paths 140 of the set of N working paths 140. The processor 210 may detect occurrence of the upgrade automatically or receive an indication of occurrence of the upgrade, for example from the NCMS 110, and in response, if the upgrade enables utilization, for at least one of the N working paths, of a frequency slot which is wider than a current widest frequency slot, the processor 210 increases slot width of the protection frequency slot, for example to that of the frequency slot which is wider than the current widest frequency slot.

In some embodiments, the protection frequency slot may be used in separate sub-slots. In such embodiments, use in separate sub-slots of the protection frequency slot may be similar to use in separate sub-slots of any one of the M protection frequency slots in the embodiment in which the apparatus 200 is operative to enable recovery from failures in up to M working paths 140 of the set of N working paths 140, and functionality of the apparatus 200 in respect of use in separate sub-slots of the protection frequency slot may be similar to functionality of the apparatus 200 in respect of use in separate sub-slots of any one of the M protection frequency slots in the embodiment in which the apparatus 200 is operative to enable recovery from failures in up to M working paths 140 of the set of N working paths 140.

It is, however, appreciated that in a 1:N recovery scheme, in a case where the protection frequency slot is used in separate sub-slots and available residue bandwidth of the protection path 150 is reallocated to one or more separate protection paths 150, the actual number of protection paths 150 increases. Such an increase in the actual number of protection paths 150 turns the 1:N recovery scheme into an M:N recovery scheme. However, a capacity of supporting recovery from failures in such M:N recovery scheme is limited to failures in working paths 140 that have frequency slots of slot widths corresponding to or less than slot widths of the separate sub-slots assuming bandwidth squeezed restoration, such as mentioned in the above-mentioned article entitled "Spectrum-Efficient and Scalable Elastic Optical Path Network: Architecture, Benefits, and Enabling Technologies", by Masahiko Jinno, Hidehiko Takara, Bartlomiej Kozicki, Yukio Tsukishima, Yoshiaki Sone, and Shinji Matsuoka, in *IEEE Communications Magazine*, November 2009, pages 66-73 and also in the above-mentioned article entitled "Spectrum-Efficient and Agile CO-OFDM Optical Transport Networks: Architecture, Design, and Operation", by Gangxiang Shen and Moshe Zukerman, in *IEEE Communications Magazine*, May 2012, pages 82-89, is not used.

In a case where a reversion procedure may be applied to transfer normal traffic from the protection path 150 back to the failed working path 140 after the failure in the failed working path 140 is repaired, allocation and utilization of the residue bandwidth of the protection path 150 may be terminated substantially when the reversion procedure is applied so as to enable the protection path 150 to return to its full capacity of protecting any working path 140 of the set of N working paths 140, and at such stage the M:N recovery scheme with limited capacity reverts to the 1:N recovery scheme.

It is appreciated that when the protection frequency slot is used in separate sub-slots, related resources which are suitable for use with the separate sub-slots may also be provisioned, typically by the NCMS 110 or by the one of the NEs 120.

Figure 4A:
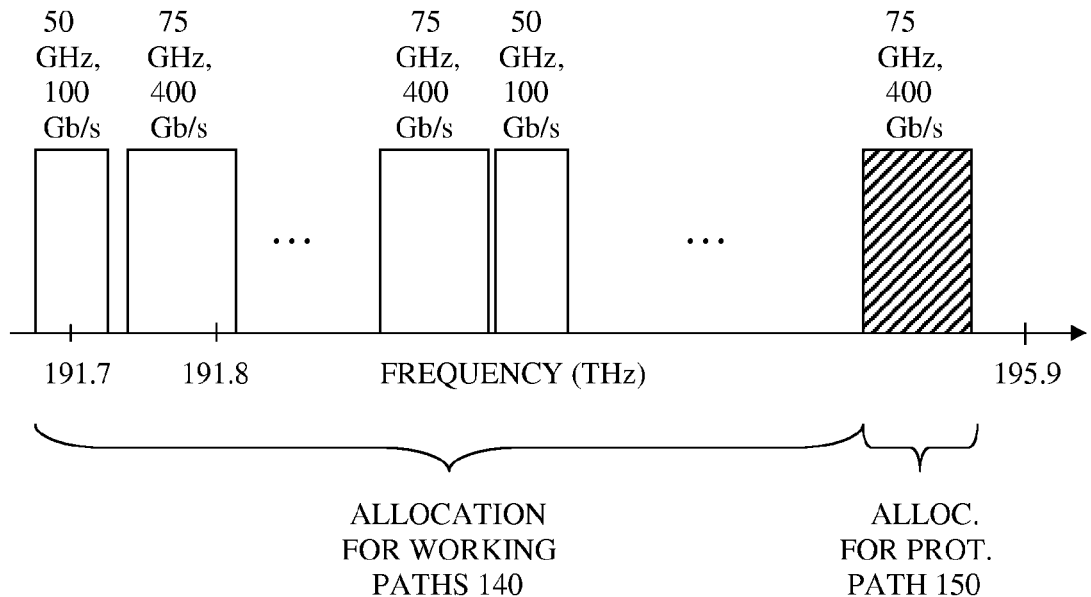
FIG. 4A is a diagram illustrating a prospective example of frequency allocation usable with the EON of FIG. 1 and the apparatus of FIG. 2 and with a 1:N recovery scheme, in accordance with an embodiment of the present invention.
Figure 4B:
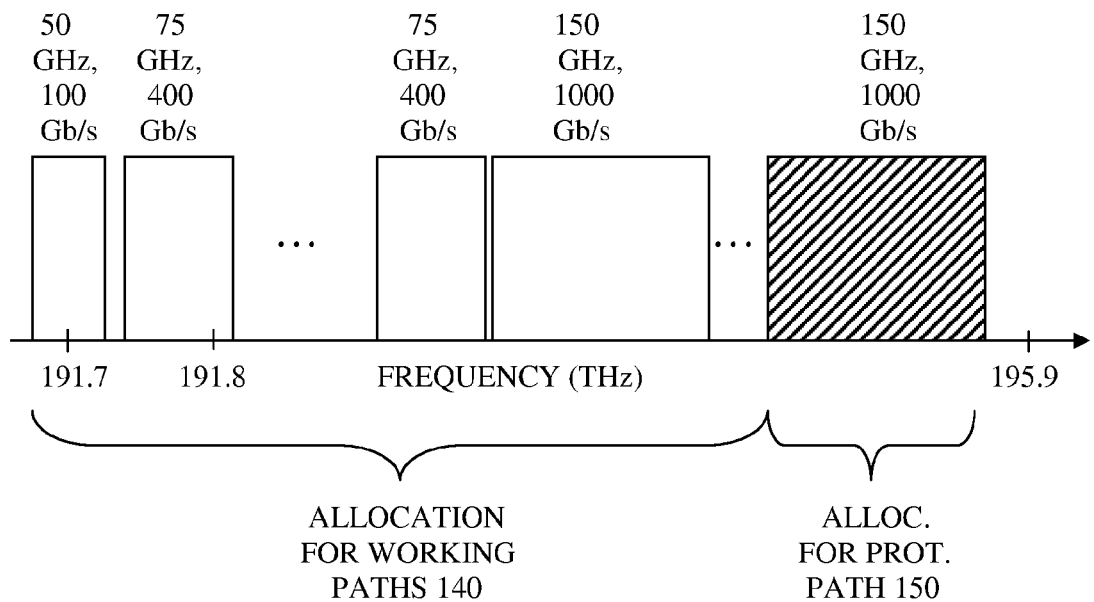
FIG. 4B is a prospective example of a modification of the frequency allocation of FIG. 4A after an upgrade.

As mentioned above, the embodiment in which the apparatus 200 is operative to enable recovery from a failure in any one working path 140 of the set of N working paths 140 may particularly be useful for 1:N recovery, and prospective examples of frequency allocation applicable to such embodiment and usable with the EON 100 and the apparatus 200 and with a 1:N recovery scheme are illustrated in FIGS. 4A and 4B, to which reference is now additionally made.

In the example of frequency allocation of FIG. 4A, which is not meant to be limiting, L=2 and the N working paths 140 are allocated frequency slots of a 50 GHz slot width for communication at a bit rate of substantially 100 Gb/s, and frequency slots of a 75 GHz slot width for communication at a bit rate of substantially 400 Gb/s. Therefore, a slot width of the widest frequency slot of the N frequency slots of L different slot widths in the example of frequency allocation of FIG. 4A is 75 GHz, and in accordance with the embodiment in which the apparatus 200 is operative to enable recovery from a failure in any one working path 140 of the set of N working paths 140, a protection frequency slot of a slot width which is at least 75 GHz is allocated to the protection path 150. The protection path 150 with the slot width of at least 75 GHz can be used to protect either a working path 140 having a 50 GHz slot width or a working path 140 having a 75 GHz slot width and is therefore suitable for enabling recovery from a failure in any one working path 140 of the N working paths 140 in the example of frequency allocation of FIG. 4A regardless of slot width of the failed working path 140.

The prospective example of FIG. 4B refers to a modification of the frequency allocation of FIG. 4A after an upgrade which results in modification of the slot width of one of the working paths 140 from 50 GHz to 150 GHz. As a result of such modification, the slot width of the widest frequency slot of the N frequency slots increases to 150 GHz, in which case slot width of the protection frequency slot is increased to at least 150 GHz.

In each of FIG. 4A and FIG. 4B, the N frequency slots allocated to the N working paths 140 are depicted, by way of a non-limiting example, as being separated by guard bands. The guard bands in FIGS. 4A and 4B are depicted as being of various widths and narrower than the frequency slots, but it is appreciated that the guard bands may be of fixed widths and/or of widths which may, by way of a non-limiting example, be similar to or greater than a slot width of any one of the frequency slots. It is further appreciated that only some of the N frequency slots may alternatively be separated by guard bands. Further alternatively, the N frequency slots may be allocated to the N working paths 140 without using any guard bands between frequency slots.

Referring now back to FIG. 2, in accordance with yet another embodiment of the present invention, which may particularly, but not only, be useful for 1+1 recovery and 1:1 recovery, the apparatus 200 is operative to enable recovery from failures in up to N working paths 140 of the set of N working paths 140. In order to enable such recovery, the processor 210 allocates N protection frequency slots having slot widths corresponding to the slot widths of the N working paths 140 to N protection paths 150, and the control plane interface 220 respectively associates, for example in response to an instruction provided by the processor 210, each of the N working paths 140 with a protection path 150 of the N protection paths 150 which has a slot width corresponding to a slot width of the associated working path 140 and effects provisioning of the N protection paths 150 for supporting recovery from the failures.

In some embodiments in which the LUT is implemented, the processor 210 may expand the LUT, for example by adding a column, to include a list of the N protection paths 150 in association with the N working paths 140. Alternatively, the processor 210 may produce a separate LUT with a list of the N working paths 140 and their associated protection paths 150.

In some embodiments, the processor 210 may allocate the N protection frequency slots to the N protection paths 150 automatically. In other embodiments, the processor 210 may allocate the N protection frequency slots to the N protection paths 150 in response to an externally generated instruction or message that may be received, for example from the NCMS 110 or from one of the NEs 120, at the I/O subsystem/interface of the processor 210, or at the input unit 230 in embodiments in which the input unit 230 is used.

In some embodiments, the control plane interface 220 may effect provisioning of the N protection paths 150 automatically following allocation of the N protection frequency slots by the processor 210. In some other embodiments, the control plane interface 220 may effect provisioning of the N protection paths 150 in response to a message or instruction provided by the processor 210.

In one embodiment, the processor 210 may change slot widths of the protection frequency slots allocated to the N protection paths 150 according to changes in slot widths of the frequency slots allocated to the N working paths 140, respectively.

In one embodiment, the processor 210 may also, for example, change a distribution of the protection frequency slots allocated to the N protection paths 150 while maintaining slot widths correspondence with the frequency slots of the N working paths 140. For example, which is not meant to be limiting, if working paths 140 of a subset of the N working paths 140 are allocated frequency slots of similar slot widths, any protection path 150 of a corresponding subset of the N protection paths 150 may be used to protect any working path 140 of the subset of the N working paths 140. Therefore, changing an arrangement of the protection paths 150 of the subset of the N protection paths 150 results in a different distribution of the protection frequency slots allocated to the N protection paths 150, but maintains slot widths correspondence with the frequency slots of the N working paths 140.

Figure 5:
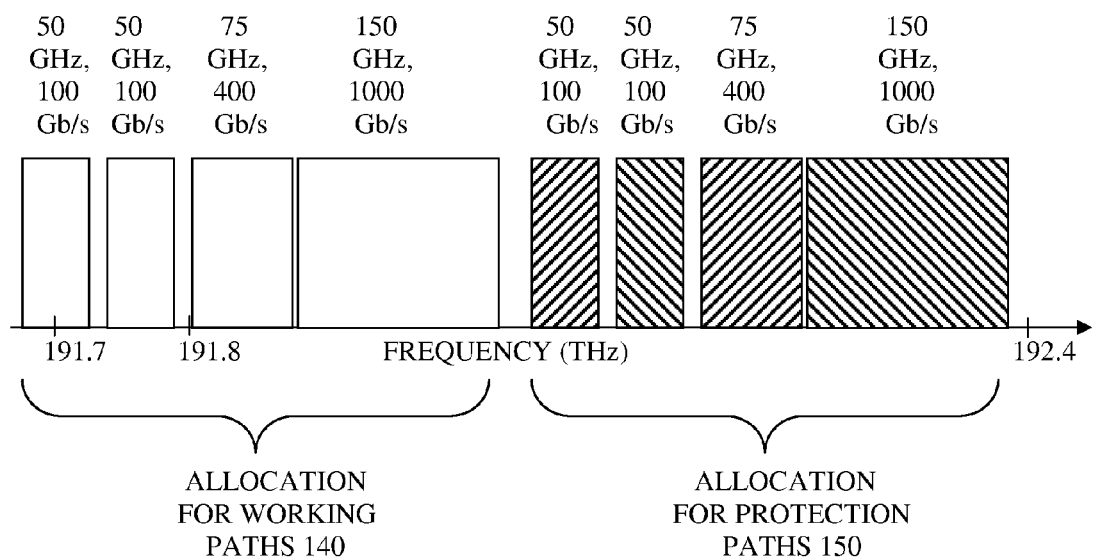
FIG. 5 is a diagram illustrating a prospective example of frequency allocation usable with the EON of FIG. 1 and the apparatus of FIG. 2 and with a 1+1 or 1:1 recovery scheme, in accordance with an embodiment of the present invention.

As mentioned above, the embodiment in which the apparatus 200 is operative to enable recovery from failures in up to N working paths 140 of the set of N working paths 140 may particularly be useful for 1+1 recovery and 1:1 recovery, and a prospective example of frequency allocation applicable to such embodiment and usable with the EON 100 and the apparatus 200 and with a 1+1 or 1:1 recovery scheme is illustrated in FIG. 5, to which reference is now additionally made.

In the example of frequency allocation of FIG. 5, which is not meant to be limiting, N=4, two of the four working paths 140 are allocated frequency slots of a 50 GHz slot width for communication at a bit rate of substantially 100 Gb/s, a third one of the four working paths 140 is allocated a frequency slot of a 75 GHz slot width for communication at a bit rate of substantially 400 Gb/s, and a fourth one of the four working paths 140 is allocated a frequency slot of a 150 GHz slot width for communication at a bit rate of substantially 1 Tb/s. In accordance with the embodiment in which the apparatus 200 is operative to enable recovery from failures in up to N working paths 140 of the set of N working paths 140, a protection frequency slot of a 50 GHz slot width is allocated to each of two protection paths 150, a protection frequency slot of a 75 GHz slot width is allocated to a third protection path 150, and a protection frequency slot of a 150 GHz slot width is allocated to a fourth protection path 150. A first one of the two working paths 140 that are allocated frequency slots of a 50 GHz slot width is associated with a first one of the two protection paths 150 that are allocated protection frequency slots of a 50 GHz slot width, a second one of the two working paths 140 that are allocated frequency slots of a 50 GHz slot width is associated with a second one of the two protection paths 150 that are allocated protection frequency slots of a 50 GHz slot width, the working path 140 that is allocated a frequency slot of a 75 GHz slot width is associated with the protection path 150 that is allocated a protection frequency slot of a 75 GHz slot width, and the working path 140 that is allocated a frequency slot of a 150 GHz slot width is associated with the protection path 150 that is allocated a protection frequency slot of a 150 GHz slot width.

In FIG. 5, the N frequency slots allocated to the N working paths 140 and the N protection frequency slots are depicted, by way of a non-limiting example, as being separated by guard bands. The guard bands in FIG. 5 are depicted as being of various widths and narrower than the frequency slots, but it is appreciated that the guard bands may be of fixed widths and/or of widths which may, by way of a non-limiting example, be similar to or greater than a slot width of any one of the frequency slots. It is further appreciated that only some of the frequency slots of the working paths 140 and/or the protection paths 150 may alternatively be separated by guard bands. Further alternatively, the frequency slots may be allocated to the N working paths 140 and the N protection paths 150 without using any guard bands between frequency slots.

Referring to the embodiment in which the processor 210 may also change a distribution of the protection frequency slots allocated to the N protection paths 150 while maintaining slot widths correspondence with the frequency slots of the N working paths 140 when applied to the example of FIG. 5, the processor 210 may, for example, change the distribution of frequency slots allocated to the protection paths 150 so as to reallocate the protection frequency slots of 50 GHz slot widths around center frequencies that are higher than a center frequency of the frequency slot of 150 GHz slot width. In such a case, the reallocated frequency slots of 50 GHz slot widths may still be used for protecting the two of the four working paths 140 that are allocated frequency slots of a 50 GHz slot width.

The example of frequency allocation of FIG. 5 refers to a case where the working paths 140 and the protection paths 150 are provisioned over the same link, and therefore the working paths 140 and the protection paths 150 are allocated frequency slots in separate frequency sub-bands. If the working paths 140 and the protection paths 150 are provisioned over separate links, frequency slots allocated to the working paths 140 in a first link may be similar to frequency slots allocated to the protection paths 150 in a separate second link, or different than frequency slots allocated to the protection paths 150 in the separate second link, or overlap frequency slots allocated to the protection paths 150 in the separate second link.

Referring now back to FIG. 2, in accordance with yet another embodiment of the present invention the apparatus 200 is operative to enable dynamic recovery from a failure in a working path 140 of the set of N working paths 140. In case a failure occurs in a working path 140, the processor 210 receives from one of the NEs 120 a failure indication message identifying the failed working path 140, and in response to receipt of the failure indication message, the processor 210 checks a slot width of the failed working path 140 to determine slot width thereof. The processor 210 then allocates a protection frequency slot of a slot width which is substantially equal to the slot width of the failed working path 140 to a protection path 150, and the control plane interface 220 effects provisioning of the protection path 150 for supporting recovery from the failure.

In some embodiments in which the LUT is implemented, the processor 210 may consult the LUT to check the slot width of the failed working path 140.

Figure 6:
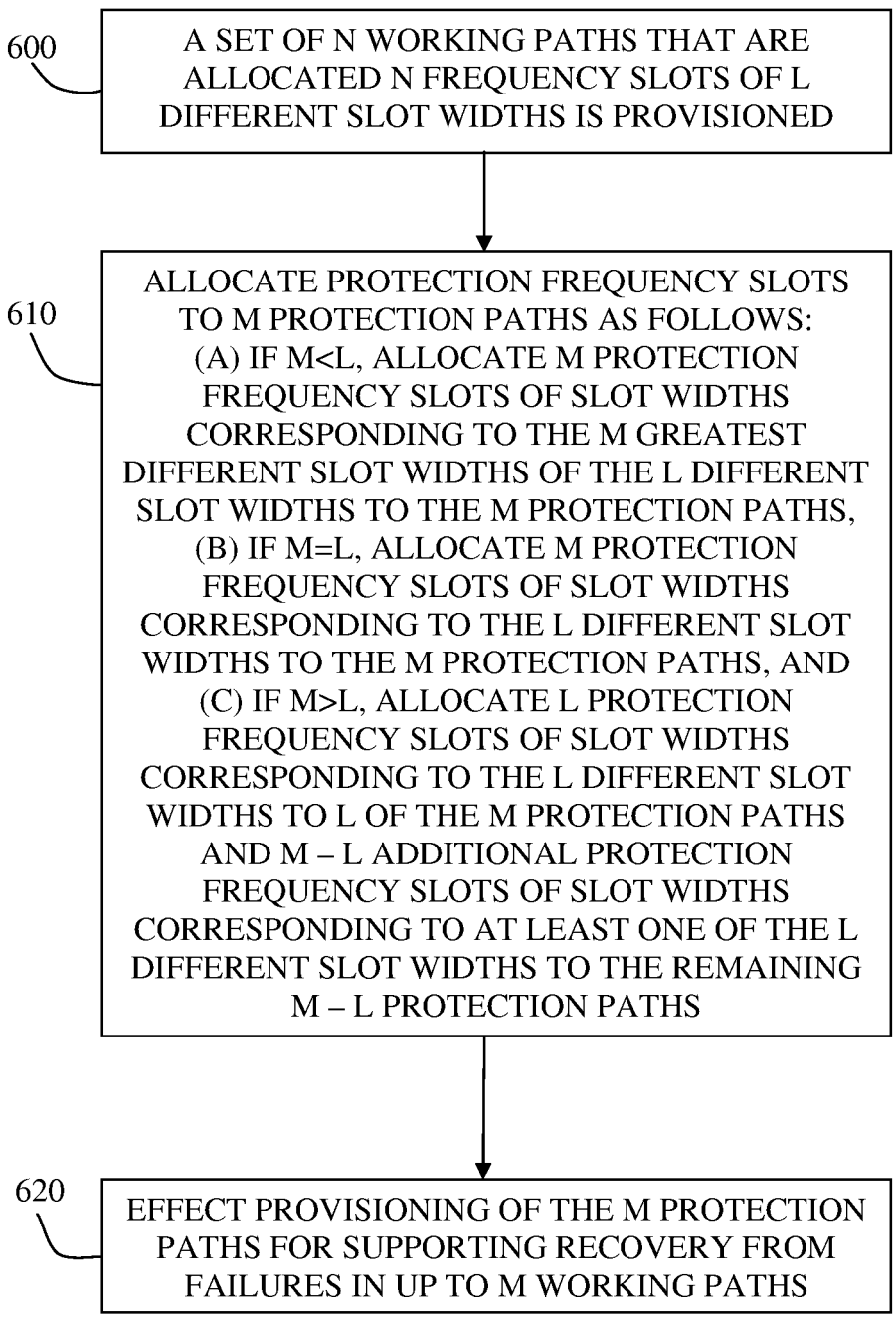
FIG. 6 is a simplified flowchart illustration of a method of enabling recovery from failures in an EON that uses an M:N recovery scheme, in accordance with an embodiment of the present invention.

Reference is now made to FIG. 6, which is a simplified flowchart illustration of a method of enabling recovery from failures in an EON that uses an M:N recovery scheme, in accordance with an embodiment of the present invention.

A set of N working paths that are allocated N frequency slots of L different slot widths is provisioned (step 600). It is appreciated that the method of FIG. 6 is intended to enable recovery from failures in up to M working paths of the N working paths, where M, N and L are positive integers, N≥L>1, and N>M>1.

Protection frequency slots are allocated to M protection paths as follows (step 610): (a) if M<L, M protection frequency slots of slot widths corresponding to the M greatest different slot widths of the L different slot widths are allocated to the M protection paths, (b) if M=L, M protection frequency slots of slot widths corresponding to the L different slot widths are allocated to the M protection paths, and (c) if M>L, L protection frequency slots of slot widths corresponding to the L different slot widths are allocated to L of the M protection paths and M−L additional protection frequency slots of slot widths corresponding to at least one of the L different slot widths are allocated to the remaining M−L protection paths.

After protection frequency slots are allocated to the M protection paths, provisioning of the M protection paths for supporting recovery from failures in up to M working paths is effected (step 620).

In some embodiments, M is compared to L to determine a satisfied one of the conditions of step 610, and allocation of the M protection frequency slots to the M protection paths in step 610 is carried out according to the satisfied one of the conditions.

Figure 7:
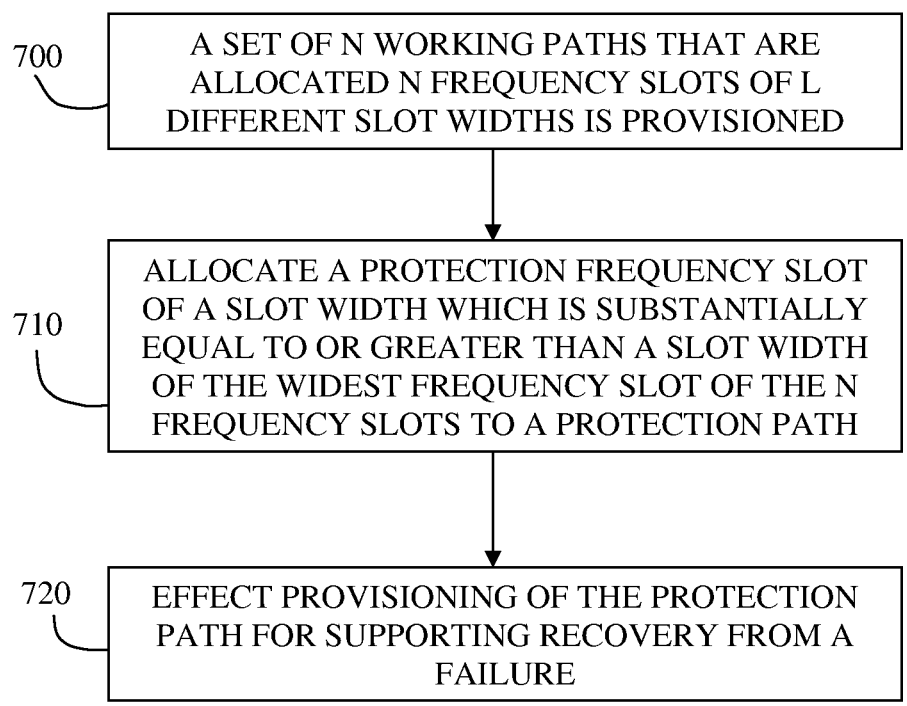
FIG. 7 is a simplified flowchart illustration of a method of enabling recovery from a failure in an EON that uses a 1:N recovery scheme, in accordance with an embodiment of the present invention.

Reference is now made to FIG. 7, which is a simplified flowchart illustration of a method of enabling recovery from a failure in an EON that uses a 1:N recovery scheme, in accordance with an embodiment of the present invention.

A set of N working paths that are allocated N frequency slots of L different slot widths is provisioned (step 700), where N and L are positive integers, and N≥L>1. It is appreciated that the method of FIG. 7 is intended to enable recovery from a failure in any one working path of the set of N working paths.

A protection frequency slot of a slot width which is substantially equal to or greater than a slot width of the widest frequency slot of the N frequency slots is allocated to a protection path (step 710), and provisioning of the protection path for supporting recovery from a failure is effected (step 720).

Figure 8:
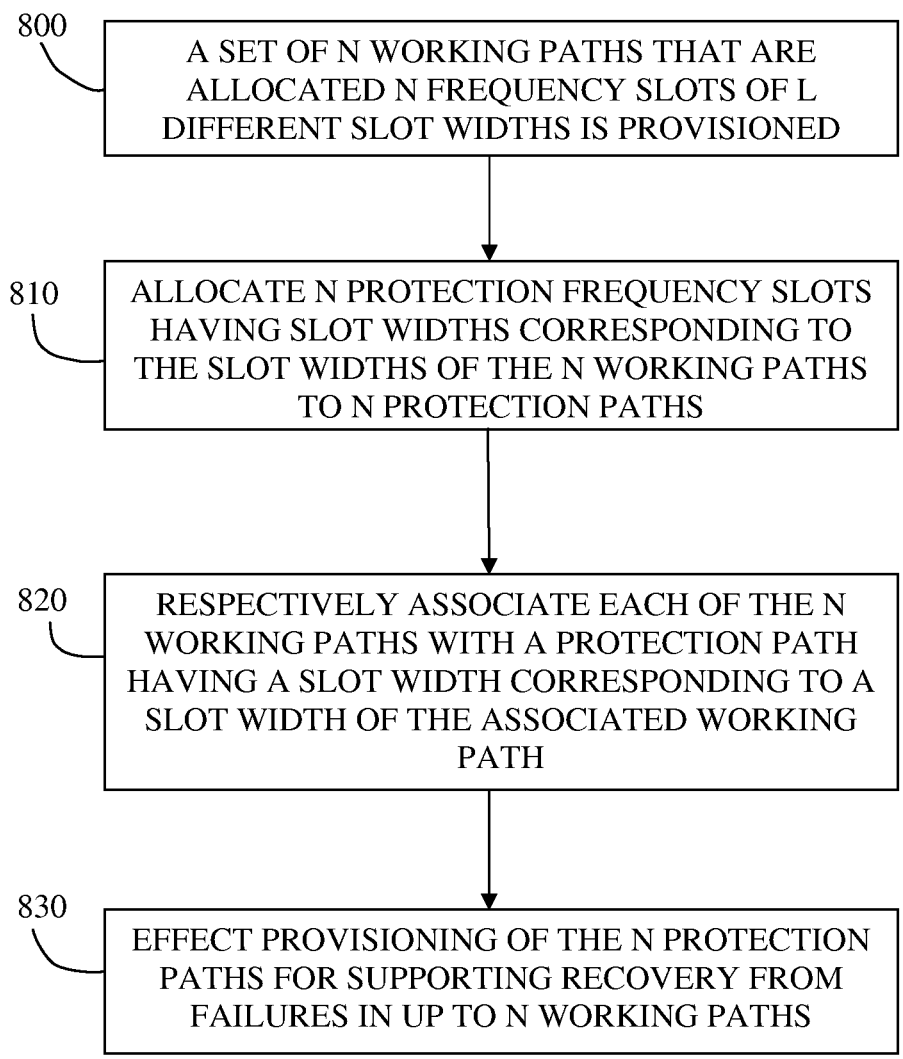
FIG. 8 is a simplified flowchart illustration of a method of enabling recovery from failures in an EON that uses a 1+1 or 1:1 recovery scheme, in accordance with an embodiment of the present invention.

Reference is now made to FIG. 8, which is a simplified flowchart illustration of a method of enabling recovery from failures in an EON that uses a 1+1 or 1:1 recovery scheme, in accordance with an embodiment of the present invention.

A set of N working paths that are allocated N frequency slots of L different slot widths is provisioned (step 800), where N and L are positive integers, and N≥L>1. It is appreciated that the method of FIG. 8 is intended to enable recovery from failures in up to N working paths of the set of N working paths.

N protection frequency slots having slot widths corresponding to the slot widths of the N working paths are allocated to N protection paths (step 810). Each of the N working paths is respectively associated with a protection path having a slot width corresponding to a slot width of the associated working path (step 820), and provisioning of the N protection paths for supporting recovery from failures in up to N working paths is effected (step 830).

Figure 9:
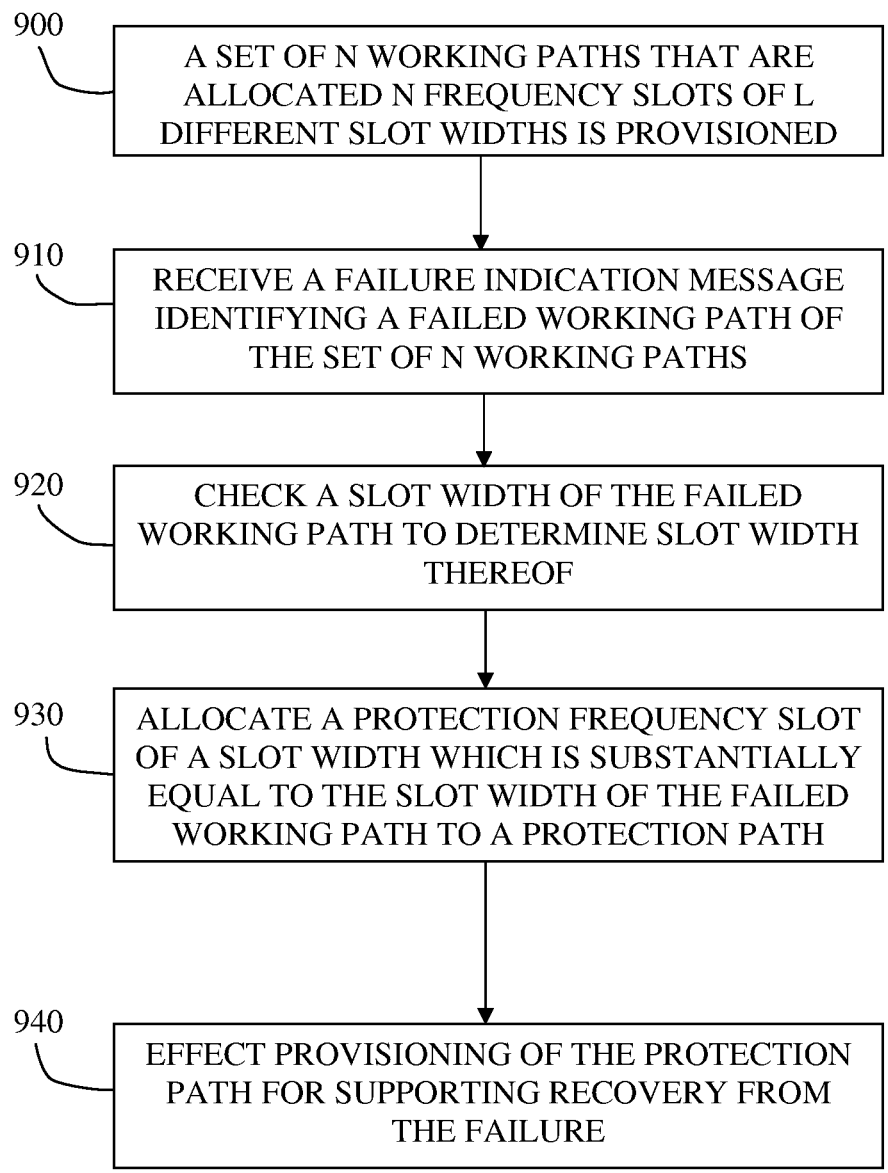
FIG. 9 is a simplified flowchart illustration of a method of enabling recovery from failures in an EON that uses a dynamic recovery scheme, in accordance with an embodiment of the present invention.

Reference is now made to FIG. 9, which is a simplified flowchart illustration of a method of enabling recovery from failures in an EON that uses a dynamic recovery scheme, in accordance with an embodiment of the present invention.

A set of N working paths that are allocated N frequency slots of L different slot widths is provisioned (step 900), where N and L are positive integers, and N≥L>1. It is appreciated that the method of FIG. 9 is intended to enable dynamic recovery from a failure in a working path of the set of N working paths.

A failure indication message identifying a failed working path of the set of N working paths is received (step 910), and a slot width of the failed working path is checked to determine slot width thereof (step 920). Then, a protection frequency slot of a slot width which is substantially equal to the slot width of the failed working path is allocated to a protection path (step 930), and provisioning of the protection path for supporting recovery from the failure is effected (step 940).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. Apparatus for enabling recovery from failures in up to M working paths of a set of N working paths that are allocated N frequency slots of L different slot widths, where M, N and L are positive integers, N≥L>1, and N>M>1, the apparatus comprising:
   a processor operative to allocate protection frequency slots to M protection paths as follows:
      if M<L, to allocate M protection frequency slots of slot widths corresponding to the M greatest different slot widths of the L different slot widths to the M protection paths;
      if M=L, to allocate M protection frequency slots of slot widths corresponding to the L different slot widths to the M protection paths; and
      if M>L, to allocate L protection frequency slots of slot widths corresponding to the L different slot widths to L of the M protection paths and to allocate M−L additional protection frequency slots of slot widths corresponding to at least one of the L different slot widths to the remaining M−L protection paths; and
   a control plane interface operatively associated with the processor and operative to effect provisioning of the M protection paths for supporting recovery from the failures.

2. The apparatus of claim 1, further comprising an input unit operatively associated with the processor and operative to receive one of an externally generated instruction and an externally generated message, wherein the processor is operative to allocate the protection frequency slots to the M protection paths in response to the one of the externally generated instruction and the externally generated message.

3. The apparatus of claim 1, wherein the N frequency slots of L different slot widths comprise one of the following: frequency slots of a flexible dense wavelength division multiplexing (DWDM) grid according to Edition 2.0 of the International Telecommunication Union (ITU) Recommendation ITU-T G.694.1 (February 2012); frequency slots that are flexibly allocated, but not according to the flexible DWDM grid according to Edition 2.0 of the ITU Recommendation ITU-T G.694.1 (February 2012); and a combination of some frequency slots of the flexible DWDM grid according to Edition 2.0 of the ITU Recommendation ITU-T G.694.1 (February 2012) and some frequency slots that are flexibly allocated, but not according to the flexible DWDM grid according to Edition 2.0 of the ITU Recommendation ITU-T G.694.1 (February 2012).

4. The apparatus of claim 1, wherein at least one of the M protection paths comprises a backup label switched path (LSP).

5. The apparatus of claim 1, wherein the N working paths are allocated the N frequency slots of L different slot widths for use with at least L different bit rates which comprise at least two of the following bit rates: substantially 100 Gigabit per second (Gb/s); substantially 400 Gb/s; and substantially 1 Terabit per second (Tb/s).

6. The apparatus of claim 1, wherein the L different slot widths comprise at least two of the following slot widths: 50 Gigahertz (GHz); 75 GHz; and 150 GHz.

7. The apparatus of claim 1, wherein at least one of the M protection paths comprises a restoration path.

8. The apparatus of claim 1, wherein the apparatus is comprised in a network control and management system (NCMS).

9. The apparatus of claim 1, wherein the apparatus is comprised in a network element (NE) at a node of an elastic optical network (EON).

10. A method of enabling recovery from failures in up to M working paths of a set of N working paths that are allocated N frequency slots of L different slot widths, where M, N and L are positive integers, N≥L>1, and N>M>1, the method comprising:
    allocating protection frequency slots to M protection paths, the allocating comprising:
       if M<L, allocating M protection frequency slots of slot widths corresponding to the M greatest different slot widths of the L different slot widths to the M protection paths;
       if M=L, allocating M protection frequency slots of slot widths corresponding to the L different slot widths to the M protection paths; and
       if M>L, allocating L protection frequency slots of slot widths corresponding to the L different slot widths to L of the M protection paths and M−L additional protection frequency slots of slot widths corresponding to at least one of the L different slot widths to the remaining M−L protection paths; and
    effecting provisioning of the M protection paths for supporting recovery from the failures.

11. The method of claim 10, further comprising comparing M to L to determine a satisfied one of the conditions, wherein the allocating comprises carrying out allocation of the protection frequency slots to the M protection paths according to the satisfied one of the conditions.

12. The method of claim 10, wherein the allocating comprises automatically allocating the protection frequency slots to the M protection paths.

13. The method of claim 10, wherein the allocating comprises allocating the protection frequency slots to the M protection paths in response to one of an externally generated instruction and an externally generated message.

14. The method of claim 10, further comprising:
identifying a working path of the set of N working paths in which a failure occurs as a failed working path;
selecting one of the M protection paths for use in recovering from the failure in the failed working path;
determining whether a frequency slot allocated to the failed working path is narrower than a protection frequency slot allocated to the selected protection path; and
effecting provisioning of only a first sub-slot of the protection frequency slot allocated to the selected protection path that has a slot width corresponding to a slot width of the failed working path for supporting recovery from the failure in the failed working path in response to a determination that the frequency slot allocated to the failed working path is narrower than the protection frequency slot allocated to the selected protection path.

15. The method of claim 14, further comprising:
determining, in response to the determination that the frequency slot allocated to the failed working path is narrower than the protection frequency slot allocated to the selected protection path, whether a second sub-slot of the protection frequency slot allocated to the selected protection path which is not used for supporting recovery from the failure in the failed working path is sufficient for utilization by one of a separate working path and a separate protection path; and
effecting provisioning of the second sub-slot of the protection frequency slot allocated to the selected protection path to the one of the separate working path and the separate protection path in response to a determination that the second sub-slot of the protection frequency slot allocated to the selected protection path is sufficient for utilization by the one of the separate working path and the separate protection path.

16. The method of claim 10, further comprising:
detecting an upgrade enabling utilization of J frequency slots that are wider than the widest frequency slot of the N frequency slots allocated to the N working paths before the upgrade, where J is a positive integer greater than or equal to one; and
reallocating the protection frequency slots to take account of the upgrade, the reallocating comprising:
if $J \geq M$, increasing slot widths of the M protection frequency slots to correspond to slot widths of the M widest frequency slots of the J frequency slots that are wider than the widest frequency slot of the N frequency slots allocated to the N working paths before the upgrade; and
if $J<M$, increasing slot widths of J of the M protection frequency slots to correspond to slot widths of the J frequency slots that are wider than the widest frequency slot of the N frequency slots allocated to the N working paths before the upgrade.

17. An elastic optical network (EON) comprising:
a plurality of network elements (NEs);
a set of N working paths over which the NEs communicate with one another, the N working paths being allocated N frequency slots of L different slot widths; and
M protection paths operative to protect communication over the working paths and having the following protection frequency slots allocated thereto:
if $M<L$, M protection frequency slots of slot widths corresponding to the M greatest different slot widths of the L different slot widths;
if $M=L$, M protection frequency slots of slot widths corresponding to the L different slot widths; and
if $M>L$, L protection frequency slots of slot widths corresponding to the L different slot widths and M−L additional protection frequency slots of slot widths corresponding to at least one of the L different slot widths,
wherein N, L, and M are positive integers, $N \geq L > 1$, and $N > M > 1$.

18. The EON of claim 17, further comprising a network control and management system (NCMS) operative to allocate the N frequency slots of L different slot widths to the N working paths and the M protection frequency slots to the M protection paths.

19. The EON of claim 17, wherein one of the NEs is operative to allocate the N frequency slots of L different slot widths to the N working paths and the M protection frequency slots to the M protection paths.

20. The EON of claim 17, further comprising a control plane via which the N working paths and the M protection paths are provisioned.

* * * * *

UNITED STATES PATENT AND TRADEMARK OFFICE
CERTIFICATE OF CORRECTION

| | |
|---|---|
| PATENT NO. | : 9,054,955 B2 |
| APPLICATION NO. | : 13/731039 |
| DATED | : June 9, 2015 |
| INVENTOR(S) | : Doron Handelman |

It is certified that error appears in the above-identified patent and that said Letters Patent is hereby corrected as shown below:

In The Specification

In Column 5, Line 39, change "$NL>1$" to --$N \geq L > 1$--

Signed and Sealed this
Fifteenth Day of December, 2015

Michelle K. Lee
*Director of the United States Patent and Trademark Office*